United States Patent [19]
Katsumoto et al.

[11] Patent Number: 6,004,209
[45] Date of Patent: Dec. 21, 1999

[54] BODY-ACOUSTIC DEVICE, PLAYING APPARATUS AND ITS CONTROL METHOD, LIGHT-BEAM UTILIZING PLAYING APPARATUS, AND ACOUSTIC APPARATUS

[75] Inventors: Atsushi Katsumoto; Akira Fujiwara; Koji Miura; Tokurou Fujiwara; Nobuo Takenouchi; Kazuyuki Seri; Masahiko Kurokawa; Keiji Fujimoto, all of Osaka, Japan

[73] Assignee: Capcom Co., Ltd., Osaka-fu, Japan

[21] Appl. No.: 08/750,233

[22] PCT Filed: May 29, 1995

[86] PCT No.: PCT/JP95/01032

§ 371 Date: Nov. 29, 1996

§ 102(e) Date: Nov. 29, 1996

[87] PCT Pub. No.: WO95/33355

PCT Pub. Date: Dec. 7, 1995

[30] Foreign Application Priority Data

| May 31, 1994 | [JP] | Japan | 6/119327 |
| May 31, 1994 | [JP] | Japan | 6/119328 |
| May 31, 1994 | [JP] | Japan | 6/119329 |
| May 31, 1994 | [JP] | Japan | 6/119330 |
| May 31, 1994 | [JP] | Japan | 6/119347 |
| Dec. 16, 1994 | [JP] | Japan | 6/313109 |

[51] Int. Cl.$^6$ .................................................. A63F 9/22
[52] U.S. Cl. .................... 463/30; 463/47; 273/148 B; 181/171
[58] Field of Search .................... 463/5, 30, 35, 463/52, 51, 2, 53, 50; 434/21, 22, 20, 18; 273/148 B, 121 A; 181/171, 172, 166

[56] References Cited

U.S. PATENT DOCUMENTS

| Re. 33,559 | 3/1991 | Fallacaro et al. ............... 463/30 X |
| 1,891,566 | 12/1932 | McKillip . |
| 2,404,653 | 7/1946 | Plebanclr ......................... 463/50 |
| 4,487,583 | 12/1984 | Brucker et al. ................. 463/5 X |
| 4,545,583 | 10/1985 | Pearman et al. ................. 463/35 X |
| 4,553,748 | 11/1985 | Allen et al. ....................... 463/30 |
| 4,574,391 | 3/1986 | Morishima . |
| 4,695,058 | 9/1987 | Carter, III et al. .............. 463/50 |
| 4,925,189 | 5/1990 | Braeunig ........................ 273/148 B |
| 4,948,371 | 8/1990 | Hall ................................. 434/21 |
| 4,981,298 | 1/1991 | Lawler et al. ................. 273/121 A |
| 5,249,806 | 10/1993 | Nathanson . |
| 5,299,810 | 4/1994 | Pierce et al. .................... 463/2 |
| 5,330,183 | 7/1994 | Gottlieb ...................... 273/121 A X |
| 5,368,484 | 11/1994 | Copperman et al. . |
| 5,405,152 | 4/1995 | Katanis et al. ................. 463/30 X |
| 5,455,396 | 10/1995 | Willard et al. . |
| 5,553,148 | 9/1996 | Werle . |

FOREIGN PATENT DOCUMENTS

| 56-95281 | 7/1981 | Japan . |
| 57-148980 | 9/1982 | Japan . |
| 62-210396 | 9/1987 | Japan .................... F41G 3/26 |
| 63-194198 | 8/1988 | Japan .................... F41G 3/26 |
| 1-130385 | 9/1989 | Japan .................... A63F 9/22 |
| 4-99581 | 3/1992 | Japan .................... A63F 9/24 |
| 4-103089 | 9/1992 | Japan .................... H04R 1/00 |
| 5-71897 | 3/1993 | Japan .................... F41G 3/26 |
| 5-192449 | 8/1993 | Japan .................... A63F 9/22 |
| 5-86387 | 11/1993 | Japan .................... A63F 9/22 |

OTHER PUBLICATIONS

Earthshaker Pinball Machine Brochure by Williams Electronic Games, Inc. © 1989.

Primary Examiner—Michael O'Neill
Attorney, Agent, or Firm—Michael D. Bednarek; Crowell & Moring LLP

[57] ABSTRACT

A sound feeling device (1) having a case main body (4) which is constituted of, at least, a case (3) having a bottom (3x) in contact with the body when the device (1) is used and a partition plate (5) which is mounted with a loudspeaker (6), and, together with the case (3), defines a sound producing space. The bottom (3x) vibrates upon receiving sounds from the loudspeaker (6), and is curved at least, at the part which is in contact with the body when used, along the shape of the body.

7 Claims, 23 Drawing Sheets

BODY-ACOUSTIC DEVICE, PLAYING APPARATUS AND ITS CONTROL METHOD, LIGHT-BEAM UTILIZING PLAYING APPARATUS, AND ACOUSTIC APPARATUS

TECHNICAL FIELD

The present invention relates to a body-acoustic device for converting electric acoustic signals into mechanical vibrations for transmission to the body of a user, a playing apparatus using the body-acoustic device, a control method therefor, a light-beam utilizing playing apparatus using the body-acoustic device, and an acoustic apparatus using the body-acoustic device.

BACKGROUND ART

A body-acoustic device converts electric sound signals, which are transmitted from a business-use game machine, a home-use game machine or any other acoustic unit, into mechanical vibrations for transmission to the body of a user. The body-acoustic device has a structure such that a speaker for emitting sound as a vibration source is elastically supported in an internal space of a container body by means of a partitioning plate. The partitioning plate divides the internal space of the container body into two airtight chambers, and the speaker is received in an opening formed in the partitioning plate. Due to the emission of sound from the speaker, air vibrations attributable to the sound pressure are generated in the internal space of the container body and transmitted to the user's body through an outer wall of the container body.

As a specific example of such body-acoustic device, Japanese Patent Application Laid-Open No. 5-316582 discloses a basic structure wherein the interior of a closed container is divided into two airtight chambers by a partition wall fitted with a speaker. The outer periphery of the partition wall is attached to the closed container by means of a buffer made of rubber or polyurethane for absorbing vibrations. Such a structure enables the partition wall to serve as a vibrating plate which is integrally vibrated with the cone paper of the speaker. Moreover, the appropriate vibration absorbing effect of the buffer prevents generation of uncomfortable echo noises.

If the partition wall is directly secured to the closed container without the buffer, distortion and split of the speaker sound cause uncomfortable echo noises and deteriorate the clearness of sound. Due to the preserve of the foregoing buffer, the uncomfortable noises can be appropriately absorbed so that the clearness of sound improves.

In the above-mentioned body-acoustic device, a through-hole is formed in the partition wall which permits the air vibrations generated in one of the airtight chambers due to the speaker sound pressure to be propagated to the other airtight chamber. Therefore, generated air vibrations are not immediately attenuated, and satisfactory air vibrations are generated in the overall internal space of the container. Moreover, the sound throttling effect attained when the air vibrations are allowed to pass through the through-hole further raises the sound pressure. Thus, the vibrations generated in the entire outer wall of the closed container are intensified.

In practical use of the body-acoustic device of the foregoing type, some means is employed to hold an outer wall portion of the body-acoustic device into contact with an appropriate portion of the user's body, and the vibrations generated due to the sound of the speaker are transmitted to the appropriate portion of the body. In a known example, the body-acoustic device is attached to a seat back so that the user's back is brought into contact with the seat back, that is, the body-acoustic device when the user is seated.

In recent years, a rucksack type body-acoustic device has been put into trial use or practical use, the body-acoustic device is fitted in the vicinity of the user's back for carrying on the back.

The closed container of the body-acoustic device disclosed in the above-described publication is cylindrical and has a flat bottom wall for contact with the human body. Therefore, if the body-acoustic device is fitted to the human body, only a portion of the bottom wall is brought into contact with the body.

Specifically, a contact portion such as the back or waist of the human body, with which the body-acoustic device is brought into contact, is undulated; macroscopically viewed, the back and the waist are warped with a certain curvature. If the bottom wall is flat, it cannot be brought into uniform contact with the back or the waist. In this case, there arises a problem that the vibrations generated in the outer wall of the closed container cannot be efficiently transmitted. Particularly, when an attempt is made to transmit viblations over a wide region of the human body, the vibrations are actually transmitted partially even if the area of the flat bottom wall is enlarged. Therefore, the efficiency in transmitting vibrations further deteriorates.

Since the body-acoustic device disclosed in the above publication requires the buffer to absorb uncomfortable noises, the number of elements increases and the assembling operation becomes complicated to result in a decrease of the working efficiency. In particular, the buffer disclosed as described above is an annular member having an annular groove formed in the inner surface thereof and arranged to receive the outer periphery of the foregoing insulating wall; and the outer periphery is secured to the inner surface of the closed contained by adhesive agent or the like. Therefore, an operation for causing the buffer to hold the insulating wall and that for allowing the buffer to adhere to the closed container are required. Each of the operations are excessively complicated operations while taking a long time. Thus, a critical problem arises when mass production is performed.

If the foregoing structure is employed, frequent vibrations of the insulating wall causes the adhesion portions of the buffer to be separated or the insulating wall unintentionally is separated from the annular groove of the buffer. Thus, a problem of the durability arises and use for a long time cannot be realized.

Each of the foregoing body-acoustic device encounters a difficulty in bringing the body-acoustic device into reliably contact with the appropriate portion of the body. What is worse, any positive contrivance is not employed. Therefore, there arises a problem in that if appropriate vibrations are generated in the body-acoustic device, the vibrations cannot efficiently be transmitted to the use.

In particular, since the foregoing rucksack structure usually comprises the fastening belts made of cloth or leather, the body-acoustic device is pushed downwards attributable to the deadweight thereof and thus the vertical pressure does not applied to the back of the user. In this case, the back cannot reliably receive the transmitted vibrations.

Moreover, since the back of the body has concave and convex portions and, in particular, the portion in the vicinity of the shoulder blades considerably project over the other portions, the outer wall of the body-acoustic device is brought into contact with the portions including the shoulder blades when the user has the body-acoustic device on the back, thus causing the outer wall to be slightly separated from the other portions. As a result, the vibrations are concentrically and partially transmitted to the portion including the shoulder blades and therefore uniform and reliable transmission of the vibrations is inhibited.

Since the body-acoustic device disclosed as described above has the structure such that the surface portion of the container body, that is, the surface wall portion opposite to the portion which is brought into contact with the body is formed by a single wall, there arises a problem in that sound emitted from the speaker leaks to the outside through the surface wall portion. This problem causes uncomfortable noise to be generated and the atmosphere condition to deteriorate.

In a case where the foregoing body-acoustic device is connected to a game machine for business use or a game machine for home use, sound obtained in response to a signal supplied from a game progression control means of the body of the game machine is, without any process, transmitted to the speaker in the body-acoustic device as an operation signal. The method of transmitting the signal for operating the speaker involves signals in all frequency regions from low frequencies to high frequencies to be transmitted to the speaker.

As a result, for example, sound in the high frequency region is uncomfortable sound in the body-acoustic device and bodily comfortable vibrations cannot be generated. When unnecessary sounds of the foregoing type are mixed with necessary sounds and they are emitted from the speaker, a user is given an unpleasant feeling. Also this causes noise to be generated and environment to deteriorate.

On the other hand, in recent years, as a game which is played by using a game machine for business use or a game machine for home use, games of a type in which a character or the like which is moved in accordance with the input operation of a player and thus the player joins the progression of the game have been put into practical uses, as well as games, the progression of which is determined or controlled by the player regardless of characters in the game.

The games of the foregoing type permitting the player to join the progression has a structure such that an input means comprising a joy stick lever, depression switches and the like is attached to the game machine and the player operates the input means while looking an image output means, such as CRT or LCD, provided or connected to the game machine to control the behavior of an image of a virtual human being corresponding to the player during the progression of the game.

The specific contents of games of the foregoing type include a variety of fields, such as games relating to sports, such as a combative sport, adventures, races and treasure hunting which have been suggested and put into practical use. During a process of the foregoing game, various sounds are emitted from a sound output means, such as a speaker, provided or connected to the game machine.

The game of the type permitting a player to join the game and each of the foregoing game machine to be used is mainly structured such that sound is emitted from the speaker provided exclusively for the game machine in a case where, for example, the situation of the image of the virtual human being corresponding to the player has been changed during the play of the game. Therefore, the sound emitted from the speaker can be heard by another person as well as the payer in a game of a type in which the victory or defeat is decided. If a state intended to be kept secret from another player exists, the secret state cannot be maintained.

As a result, the contents of the game is fully disclosed and therefore satisfactory thrill cannot be provided. Moreover, a process in which a player plays the game while making the situation secret in accordance with information which is recognized by only the player cannot be employed because of the sound emission. Thus, there arises a problem in that the game cannot be manufactured freely and the contents are limited.

Although the game of the foregoing type is structured to use only voice and effect sound to provide reality and power for the player, the foregoing contrivance poorly provides the atmosphere by only the auditory sense and the visual sense for the player. Further improved reality and satisfactory power cannot be obtained and there arises a problem in that provided entertainment and pleasure are unsatisfactory.

On the other hand, as type of a play put into practical use in recent years, a shooting game is known in which a plurality of players each having a light beam gun simulate shooting outdoor to decide victory or defeat in accordance with a decided rule such that, for example, the player exhibiting a larger number of hits is made to be a victor.

A playing apparatus or a playing device for use in a game of the foregoing usually comprises a light beam gun including a light emission portion and a target device to which a light receiving portion is attached. The target device is attached to, for example, the breast of each player. Other players each having the light beam gun by the hand aim and emit light to the target device. In accordance with whether the light beam is received by the light receiving portion of the target device, whether the player is hit is determined.

Hitherto, a structure has been arranged such that electronic sound is produced when the light beam emitted from the light beam gun hits the target of the enemy. Moreover, when the number of hits of the light beams for one player reaches a predetermined time, louder electronic sound or different type electronic sound is produced to inform the player to be the defeated.

Another structure is adapted to the foregoing playing apparatus in which the player has spectacles having a display portion to display the number of hits in the spectacles or the like to enable each player to recognize the hit. Another method is employed in which the display portion of the spectacles is used to display a fact that the muzzle of the light beam gun aims the light receiving portion of the target device, that is, one player is aimed by another player.

The playing apparatus for use in the conventional simulative shooting game is simply structured such that sound is emitted when a light beam hits the target device. Thus, a problem arises in that the power for the player is unsatisfactory. Moreover, there arises a problem in that the requirement for providing improved reality cannot be satisfied.

If the structure in which the number of hits of the target device or the state where the player is aimed by another player is displayed on the spectacles is employed, a complicated and time taking operation for fitting the spectacles is required. Moreover, the spectacles are obstructive for the player who acts during the game.

A body-acoustic device has been disclosed in, for example, Japanese Patent Laid-Open No. 2-266797 in order to cause voice in a very low-pitched sound region, which has been considered difficult to be reproduced by a usual speaker, to be directly sensed by the body of the player. In the disclosure above, an electric acoustic signal is converted into mechanical vibrations so as to be transmitted to the sense of a human being.

A body-acoustic device of the foregoing type is arranged to be included in a chair or fitted to the body. In, for example, a video game apparatus, an effect of empathy for providing a feeling of identification with the hero of the game for the player is expected.

In a case where the conventional body-acoustic device is employed in, for example, a game apparatus, a confused feeling is given to the player attributable to the bipolar separation of the sound and acoustic sound. Thus, the effect of empathy becomes unsatisfactory, and in an extreme case, uncomfortable feeling is provided. That is, the essential portion of the game is performed on the display screen of a display apparatus disposed in front of the player. In many cases, a speaker is integrally provided for the display apparatus or a speaker is disposed adjacent to the display apparatus. Therefore, also an acoustic image produced by the speaker is located on a plane. On the other hand, since the body-acoustic device directly transmit vibrations to the body of a human being, a sound generating point exists adjacent to the player. Therefore, the position of the acoustic image of the speaker and the acoustic image of the body-acoustic device are deviated from each other, the sound which is vibrations of air generated by the speaker and the acoustic sound, which is mechanical vibrations generated by the body-acoustic device are separated from each other.

If the player has a headphone, the acoustic image emitted by the speaker can be located near the body-acoustic device. However, the foregoing method causes all of acoustic images to be located near the body-acoustic device. Therefore, an arbitrary portion of the acoustic images cannot freely be controlled so as to be located near the body-acoustic device.

DISCLOSURE OF THE INVENTION

Accordingly, an object of the present invention is to provide a body-acoustic device which is capable of improving efficiency in transmitting vibrations when the body-acoustic device has been fitted to the body, which eliminates the need for a buffer for elastically supporting a partition wall to a container is omitted so as to decrease the number of elements and facilitate the assembling operation, and which is less costly but yet exhibits excellent vibration characteristics and vibration propagation characteristics.

Another object of the present invention is to enable the entire surface of a tail side outer wall of a rucksack type body-acoustic device to be brought into uniform contact with the back of a user and to improve contact of a body-acoustic device with a human body regardless of the type of the body-acoustic device so as to efficiently transmit vibrations to the human body.

Another object of the present invention is to provide reliable sound insulation of the container of a body-acoustic device against the outside and to process acoustic signals for transmission of only comfortable vibrations to the body of a user while preventing generation of noises.

Another object of the present invention is to provide a playing apparatus which is capable of causing a player to recognize the situation of the player during the progression of a game by a sense other than the visual sense and the auditory sense and enabling the player to play the game in secrecy against other players, thereby increasing the freedom in designing games while providing a high reality.

Another object of the present invention is to provide an improved playing apparatus which is usable in a simulated shooting game particularly wherein a hit of a light beam at a target or a state before the hit can be body-acoustically sensed without relying on the visual sense or the auditory sense, thereby providing a satisfactory thrill and a high reality.

Another object of the present invention is to make the acoustic image from a speaker and the body -acoustic image from a body-acoustic device coincide in position with each other for prevention of polarizing separation between the sound and the body-acoustic effect when the speaker and the body-acoustic device are simultaneously employed.

According to a first aspect of the present invention, there is provided a body-acoustic device comprising a container which includes at least a container body having a bottom portion for contact with a human body, and a partitioning plate fitted with a speaker, a sound generating space being formed between said partitioning plate and said container body, said bottom portion of said container body being vibrated in response to sound emitted from said speaker, wherein at least a part of said bottom portion of said container body adapted for contact with the human body is warped to fit in shape to a contact portion of the human body.

According to a second aspect of the present invention, there is provided a body-acoustic device comprising a container which includes at least a container body having a bottom portion for contact with a human body, and a partitioning plate fitted with a speaker, a sound generating space being formed between said partitioning plate and said container body, said speaker is elastically supported by said container body, said bottom portion of said container portion being vibrated in response to sound emitted from said speaker, wherein at least a part of said partitioning plate comprises a wave plate portion which flexibly vibrates with said speaker.

In a preferred embodiment of the present invention, said partitioning plate has an outer periphery directly secured to said container portion.

In another preferred embodiment of the present invention, said wave plate portion comprises a plurality of annular serrations which are concentric with an opening formed in said partitioning plate for attachment to said speaker.

According to a third aspect of the present invention, there is provided a body-acoustic device comprising a container, a partitioning plate for forming a sound generating space between said partitioning plate and a bottom portion of said container, and a speaker attached to said partitioning plate for emitting sound, wherein said body-acoustic device further comprises body fitting means for holding the bottom portion of said container in contact with the back of a human body, at least the bottom portion of said container is shaped to avoid interference with the human shoulder blades when attached to the human body.

In a preferred embodiment of the present invention, said container is shaped to decrease in width in one direction from a predetermined longitudinally intermediate position of said container.

According to a fourth aspect of the present invention, there is provided a body-acoustic device comprising a container, a partitioning plate for forming a sound generating space between said partitioning plate and a bottom portion of said container, and a speaker attached to said partitioning plate for emitting sound, wherein said body-acoustic device further comprises body fitting belts for holding the bottom portion of said container body in contact with a human body, each of said body fitting belts being formed, at least partially, with through-holes.

In a preferred embodiment of the present invention, at least a portion of each said body fitting belt is made of an elastically expandable member.

According to a fifth aspect of the present invention, there is provided a body-acoustic device comprising a container which includes at least a container body having a bottom portion for contact with a human body, and a partitioning plate fitted with a speaker, a sound generating space being formed between said partitioning plate and said container portion, said bottom portion of said container body being vibrated in response to sound emitted from said speaker, wherein a head side of said container body is covered by a double-structure cover member having an intervening auxiliary space.

In a preferred embodiment of the present invention, at least a top portion of said double-structure cover member is made of a thin elastic member.

In another preferred embodiment of the present invention, the body-acoustic device further comprises sound generating means for transmitting sound signals to said speaker, and a low-pass filter or a band-pass filter provided at an intermediate position of a signal transmission path from said sound generating means to said speaker for cutting at least sound signals of a high frequency region.

In still another preferred embodiment of the present invention, said sound generating means transmits, to sound output means of a game machine, sound obtained in accordance with signals supplied from game progression state control means of the game machine while transmitting the sound to said signal transmission path as sound signals.

According to a sixth aspect of the present invention, there is provided a playing apparatus incorporating a game machine which comprises input means operated by a player, game progression control means for determining or controlling a progression state of a game in response to signals from said input means, and output means for generating image information signals in response to signals from said game progression control means, the image information including at least a character manipulated in response to operation of said input means by a player, said playing apparatus further comprising: specific state determining means for determining, in response to signals from said game progression control means, whether or not the character manipulated by the operator during the game is in a specific state; vibration information control means for transmitting vibration information signals upon detection of the specific state by the specific state determining means; and vibration generating means for generating vibrations in response to the vibration information signals from said vibration information control means.

According to a seventh aspect of the present invention, there is provided a playing apparatus incorporating a game machine which comprises input means operated by a player, game progression control means for determining or controlling a progression state of a game in response to signals from said input means, and output means for generating image information signals in response to signals from said game progression control means, the image information including at least a character manipulated in response to operation of said input means by a player, said playing apparatus further comprising: specific state determining means for determining, in response to signals from said game progression control means, whether or not the character manipulated by the operator during the game is in a dangerous state; vibration information control means for transmitting vibration information signals upon detection of the dangerous state by the specific state determining means; and vibration generating means for generating vibrations in response to the vibration information signals from said vibration information control means.

According to an eighth aspect of the present invention, there is provided a playing apparatus incorporating a game machine which comprises input means operated by a player, game progression control means for determining or controlling a progression state of a game in response to signals from said input means, and output means for generating image information signals in response to signals from said game progression control means, the image information including at least a character manipulated in response to operation of said input means by a player, said playing apparatus further comprising: specific state determining means for determining, in response to signals from said game progression control means, whether or not the character manipulated by the operator during the game is in an advantageous state; vibration information control means for transmitting vibration information signals upon detection of the advantageous state by the specific state determining means; and vibration generating means for generating vibrations in response to the vibration information signals from said vibration information control means.

In a preferred embodiment of the present invention, said specific state determining means determines whether or not the state of said character during the game changes with a predetermined regularity, and upon such detection, said vibration information control means transmits vibration information signals with a change following the state change of said character.

In another preferred embodiment of the present invention, said input means is independently operable by two or more players, said specific state determining means separately determining the states of two or more characters operated by the two or more players during the game, said vibration information control means transmitting separate vibration information signals to two or more vibration generating means in accordance with the results of determination made by said specific state determining means.

In a further embodiment of the present invention, said vibration generating means is a body-acoustic device which causes an outer wall of a container to vibrate in accordance with sound generated by a speaker, the vibration information signals from said vibration information control means comprising acoustic signals transmitted to said speaker.

In still another preferred embodiment of the present invention, the acoustic signals transmitted to said speaker are acoustic signals in a predetermined low frequency region.

According to a ninth aspect of the present invention, there is provided a method for controlling a playing apparatus incorporating a game machine which comprises input means operated by a player, game progression control means for determining or controlling a progression state of a game in response to signals from said input means, and output means for generating image information signals in response to signals from said game progression control means, the image information including at least a character manipulated in response to operation of said input means by a player, the method comprising: transmitting vibration information signals to vibration generating means when it is determined, in response to signals from said game progression control means, that the character manipulated by the operator during the game is in a specific state.

According to a tenth aspect of the present invention, there is provided a method for controlling a playing apparatus incorporating a game machine which comprises input means operated by a player, game progression control means for determining or controlling a progression state of a game in response to signals from said input means, and output means for generating image information signals in response to signals from said game progression control means, the image information including at least a character manipulated in response to operation of said input means by a player, the method comprising: transmitting vibration information signals to vibration generating means when it is determined, in response to signals from said game progression control means, that the character manipulated by the operator during the game is in a dangerous state.

According to an eleventh aspect of the present invention, there is provided a method for controlling a playing apparatus incorporating a game machine which comprises input means operated by a player, game progression control means for determining or controlling a progression state of a game in response to signals from said input means, and output means for generating image information signals in response to signals from said game progression control means, the image information including at least a character manipulated in response to operation of said input means by a player, the method comprising: transmitting vibration information signals to vibration generating means when it is determined, in response to signals from said game progression control means, that the character manipulated by the operator during the game is in an advantageous state.

In a preferred embodiment of the present invention, a body-acoustic device is used as said vibration generating means, an outer wall of a container being caused to vibrate in accordance with sound generated by a speaker of said body-acoustic device, acoustic signals being transmitted to said speaker as said vibration information signals.

In another preferred embodiment of the present invention, acoustic signals in a predetermined low frequency region are transmitted to said speaker.

According to a twelfth embodiment of the present invention, there is provided a light-beam utilizing playing apparatus comprising a light projector having light emitting means for emitting a light beam, and a light receiver having light receiving means for receiving the light beam, said playing apparatus further comprising: a body-acoustic device including a container having an outer wall which vibrates in accordance with sound generated by a speaker provided in the container; and sound control means for transmitting sound signals to said speaker of said body-acoustic device when the light beam emitted from said light emitting means is received by said light receiving means.

In a preferred embodiment of the present invention, said light projector is a playing light-beam gun for emitting a light beam from a muzzle tip, and said light receiver device is a target device worn by a player.

In another preferred embodiment of the present invention, said light emitting means is designed to emit at least two kinds of light signals as light beams, said sound control means being designed to transmit different kinds of sound signals to said speaker of said body-acoustic device in accordance with the kinds of the light signals received by said light receiving means.

According to a thirteenth embodiment of the present invention, there is provided an acoustic apparatus comprising: a plurality of speakers for converting acoustic signals, which are generated in accordance with digital data stored in a storage medium, into air vibrations for transmission to a human auditory sensor; and a body-acoustic device for converting the acoustic signals into mechanical vibrations for transmission to a human tactile sensor; wherein said digital data is processed in order to locate any optional portion or the whole of an acoustic image from said plural speakers at a position near said body-acoustic device.

According to a fourteenth embodiment of the present invention, there is provided an acoustic apparatus comprising: a plurality of speakers for converting acoustic signals, which are generated in accordance with digital data stored in a storage medium, into air vibrations for transmission to a human auditory sensor; acoustic image position control means for processing the digital data reproduced from said storage medium to positionally controlling an acoustic image from said plural speakers in an optional manner; and a body-acoustic device for converting the acoustic signals into mechanical vibrations for transmission to a human tactile sensor; whereby any optional portion or the whole of the acoustic image from said plural speakers can be located at a position near said body-acoustic device.

In a preferred embodiment of the present invention, said acoustic apparatus is associated with a video apparatus, said storage medium also storing image information as digital data in addition to sound information, the sound information being correlated with the image information.

In another preferred embodiment of the present invention, said acoustic apparatus is associated with a video game machine, said storage medium also storing image information as digital data in addition to sound information, the sound information being correlated with the image information, reproduced image information being variable by operation of a player in accordance with a program stored in said storage medium.

In a further preferred embodiment of the present invention, said acoustic apparatus is associated with a video game machine, said storage medium also storing image information as digital data in addition to sound information, the sound information being correlated with the image information, reproduced image information being variable by operation of a player in accordance with a program stored in said storage medium.

In still another preferred embodiment of the present invention, said acoustic image position control means is designed to operate sound output means in accordance with an acoustic image position control program stored in said storage medium.

In a still further embodiment of the present invention, said acoustic image position control means is mounted on said video game machine as an external apparatus.

In still another embodiment of the present invention, said storage medium is a CD-ROM.

Various features and advantages of the present invention will become apparent from the following description of the embodiments given with reference to the accompanying drawings.

BEST MODE FOR CARRYING OUT THE INVENTION

Embodiments of the present invention will now be described with reference to FIGS. 1 to 23.

Figure 1:
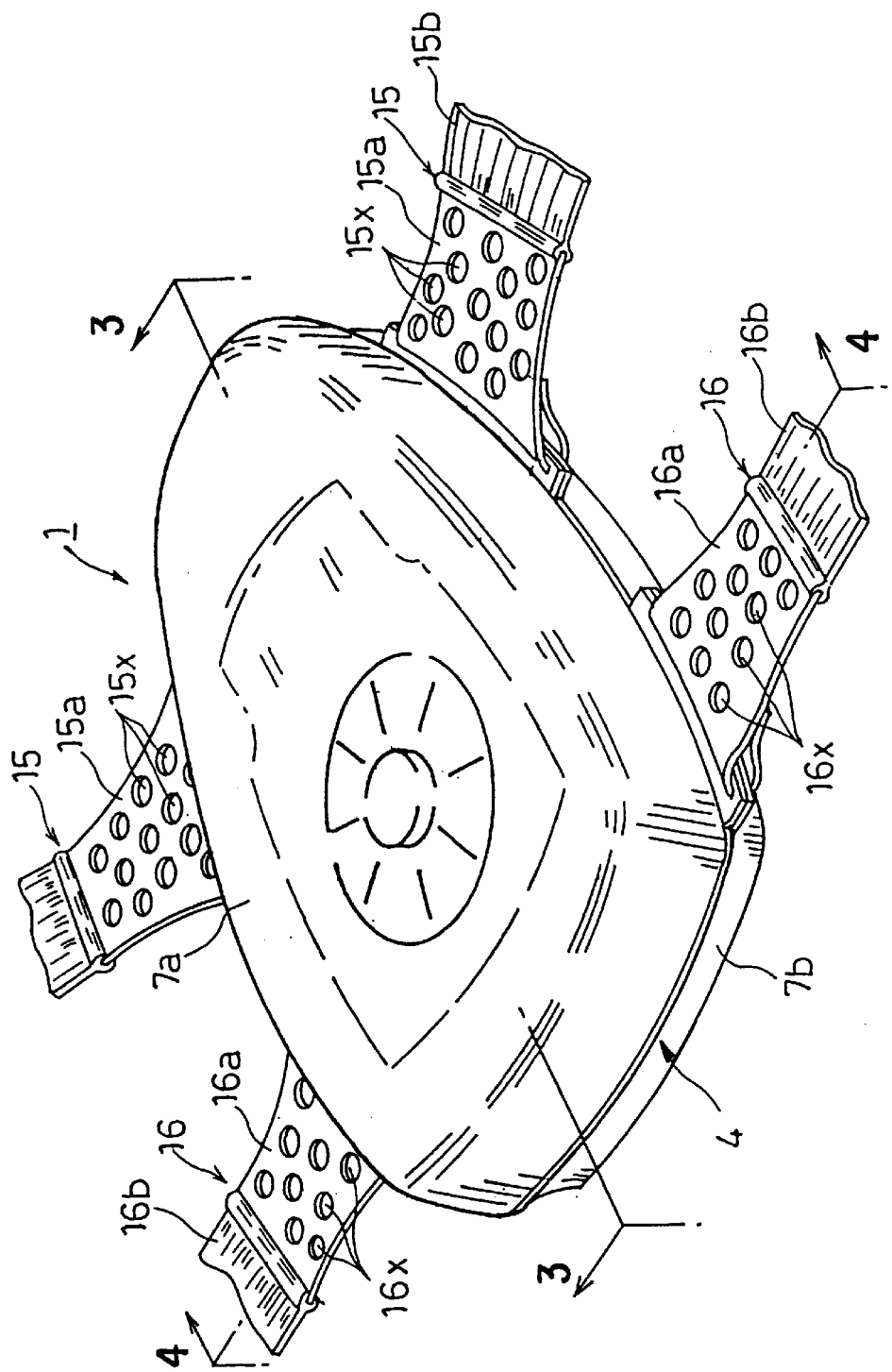
FIG. 1 is a perspective view showing the external configuration of a body-acoustic device according to an embodiment of the present invention.
Figure 2:
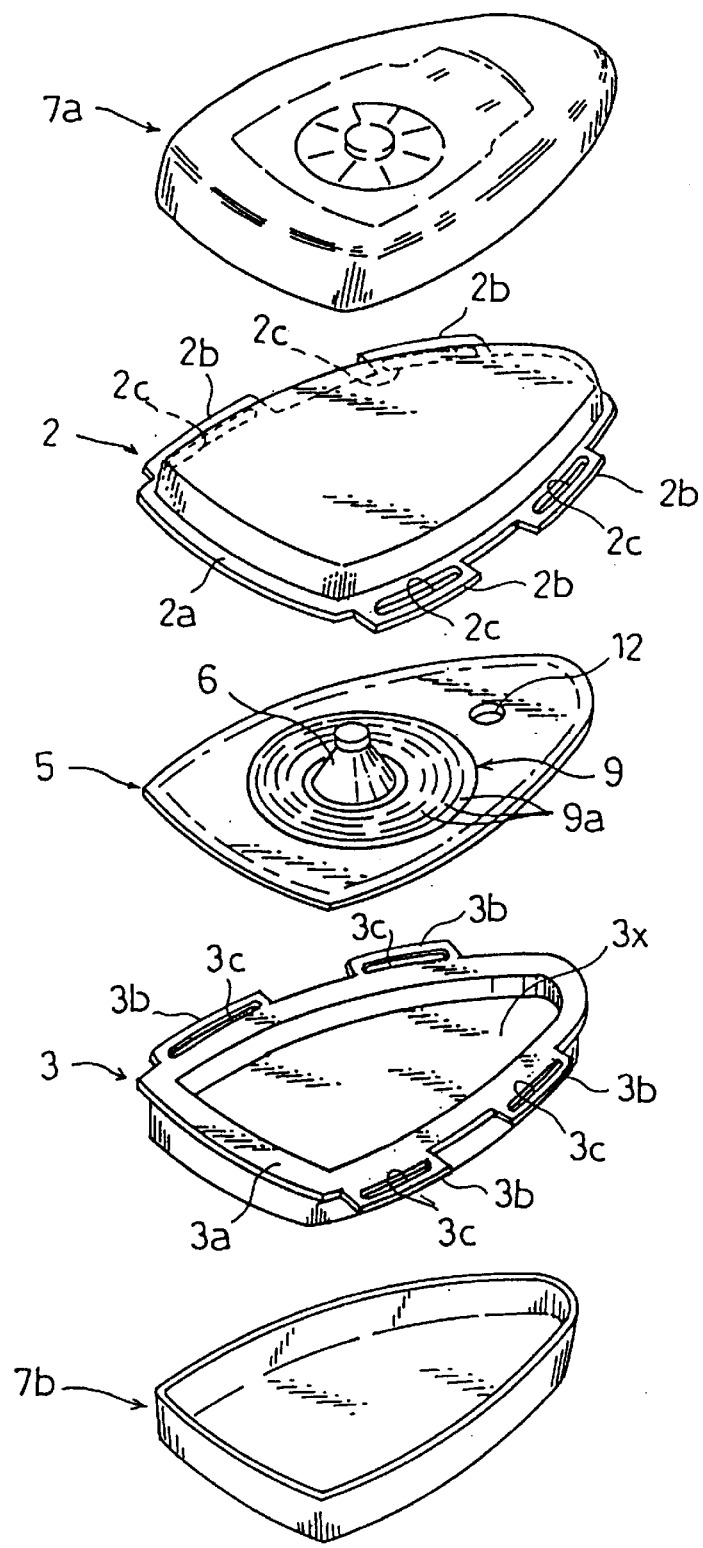
FIG. 2 is an exploded perspective view showing the body-acoustic device embodying the present invention.

FIG. 1 is a perspective view showing a body-acoustic device according to an embodiment of the present invention. FIG. 2 is an exploded perspective view showing the structure of the same.

Figure 3:
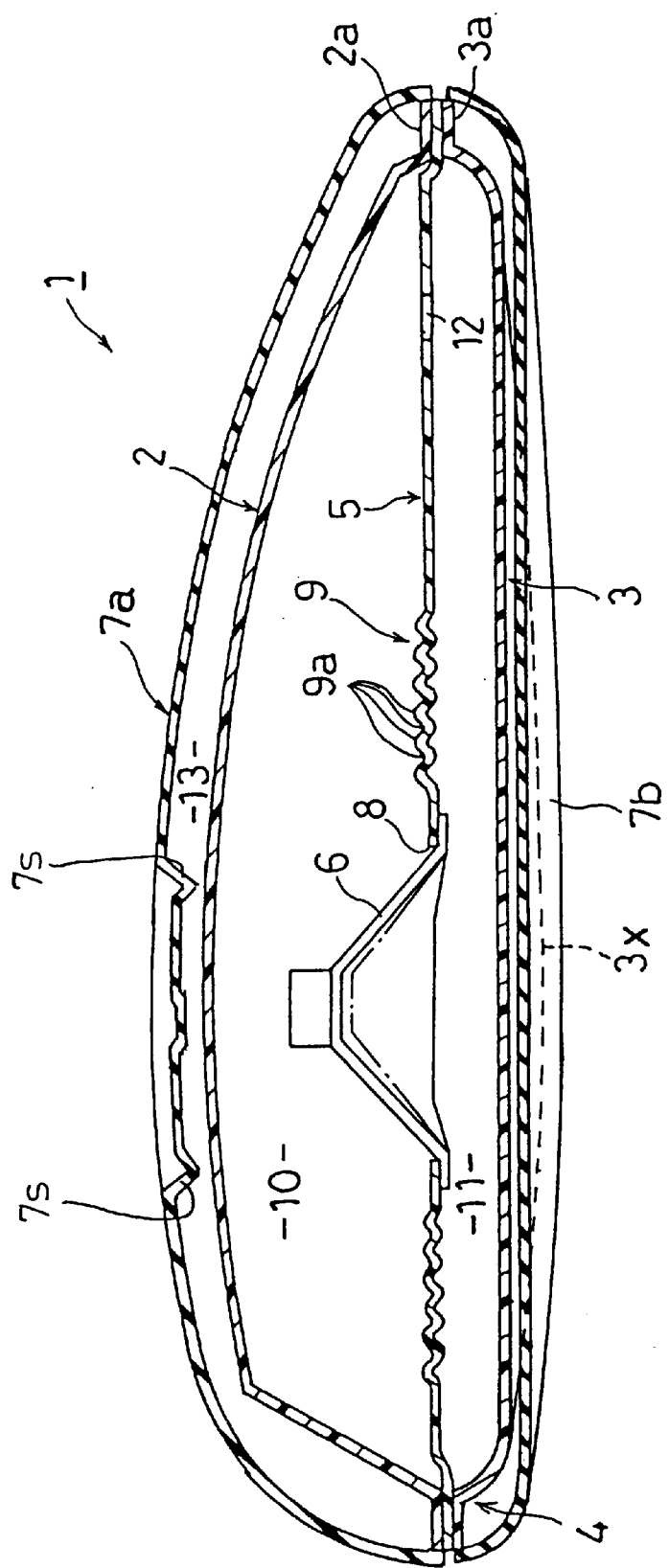
FIG. 3 is an enlarged vertical sectional view taken along lines A—A shown in FIG. 1.
Figure 4:
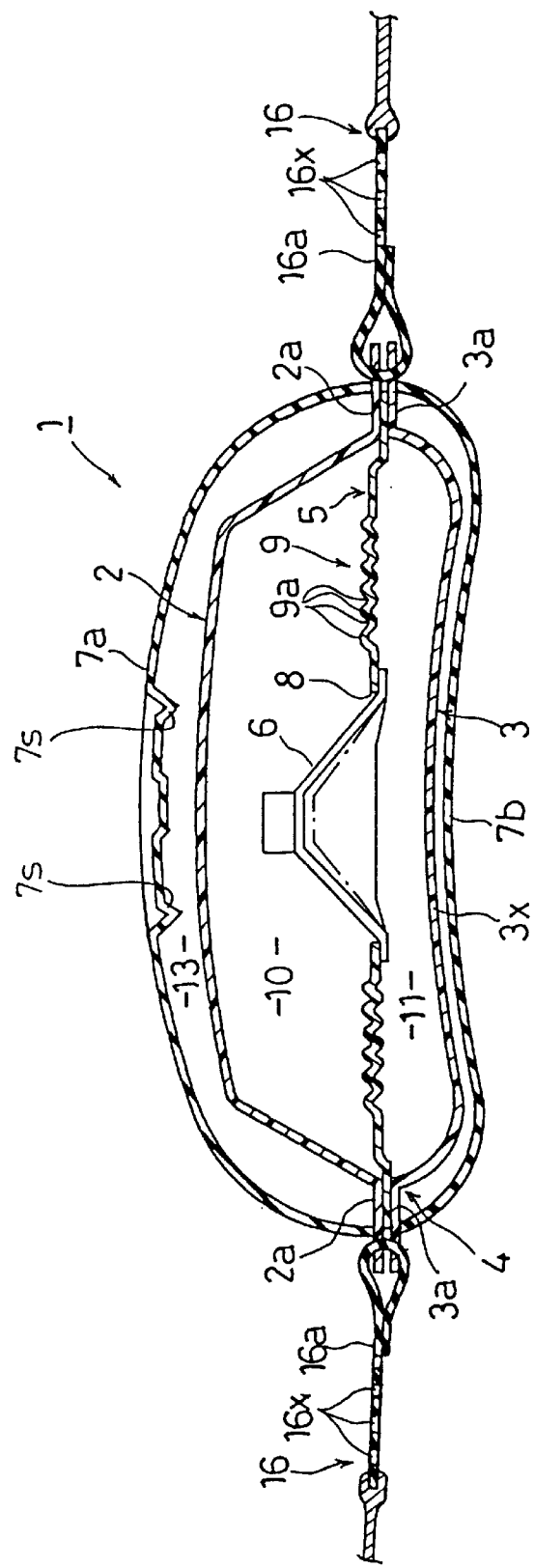
FIG. 4 is an enlarged vertical sectional view taken along lines B—B shown in FIG. 1.

FIGS. 3 and 4 are vertical sectional views of the same. The body-acoustic device 1 a container 4 formed by combining half cases 2 and 3 with each other to form an internal space therebetween, a partition plate 5 for dividing the internal space of the container 4, and a speaker 6 attached to the partition plate 5. As shown in FIG. 1, ends of shoulder belts 15 for winding around the shoulders of a user and ends of side belts 16 for fitting in the vicinity of the sides of the user are connected to both sides of the body-acoustic device 1. A top cover member 7a forming a double wall structure for sound insulation is attached to the top of the container 4. Moreover, a bottom cover member 7b for direct contact with a human body is attached to the bottom of the container 4.

The container 4 may be alternatively formed by two members, that is, the bottom half case 3 and the partition plate 5. In this case, the top half case 2 serves as a protective cover. Thus, any structure may be employed if a sound generative space 11 is formed between the bottom half case 3 and the partition plate 5. Therefore, complete air tightness between the top half case 2 and the partition plate 5 is not required.

On the other hand, a bottom portion 3x of the bottom half case 3 is warped to have a depressed widthwise central portion, as shown in FIG. 4. Moreover, each widthwise side portion of the bottom portion 3x is made to bulge at a longitudinal center position, as shown in FIG. 3. Thus, the bottom portion 3x is warped to fit to the back of a user. In this way, consideration is taken to ensure that the entire surface of the bottom portion 3x is brought into uniform contact with the user's back. It should be noted that the bulging portion shown in FIG. 3 may be omitted in the case where the bottom portion 3x is formed to correspond to, for example, the waist of the user.

On the other hand, the partition plate 5 is may be made of a generally known resin such as polypropylene, polyethylene, polystyrene, ABS resin, polycarbonate, PWA, MMA, FRP, EBER resin or rubber resin which is hard or semi-hard. The partition plate 5 is formed, generally at its center, with a circular opening 8, and the outer periphery of the mouth of the speaker 6 is secured to a peripheral portion of the opening 8 by screws, rivets, adhesive agent or the like. In this case, the mouth of the speaker 6 faces the bottom portion 3x of the bottm half case 3, as shown in FIGS. 3 and 4. Therefore, the mouth of the speaker 6 faces the body of the user.

Figure 6:
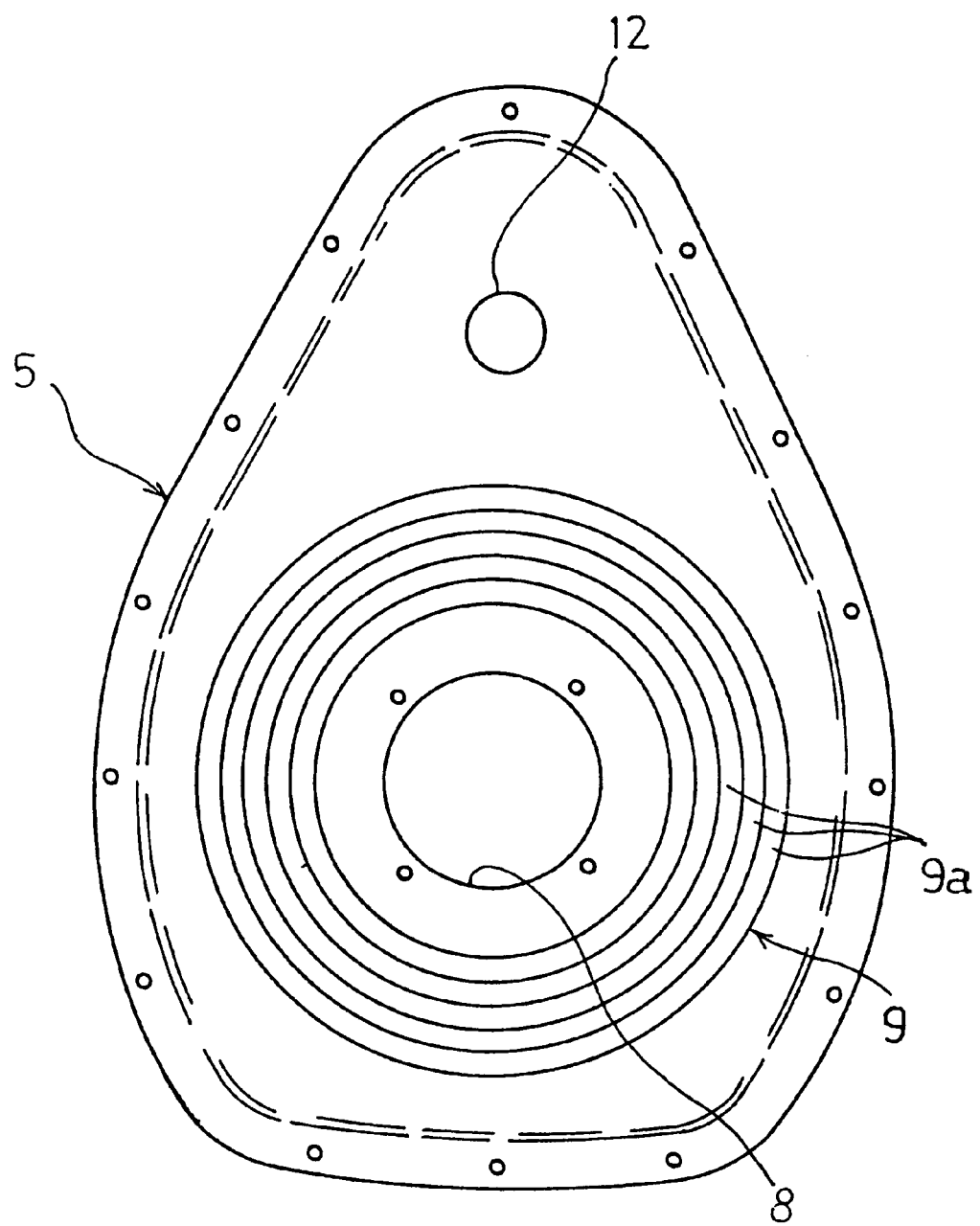
FIG. 6 is a plan view showing only a partitioning plate of the body-acoustic device embodying the present invention.

As shown in FIG. 6, a wave portion 9 having a plurality of annular serrations 9a is formed around the opening 8 of the partition plate 5 concentrically therewith. The speaker 6 is elastically supported by the wave portion 9 so that the wave portion 9 flexibly vibrates with the speaker 6. At a portion of the partition plate 5 where the wave portion 9 is not formed, there is formed a through-hole 12 for enabling transmission of air vibrations between a background space 10 and the sound generative space 11 as separated by the partition plate 5. If necessary, the through-hole 12 may be replaced by a slit for example.

However, it has been experimentally confirmed that satisfactory vibrations may be obtained without the wave portion 9 and the through-hole 12 depending on the material of the partition plate 5. Therefore, it is preferable that the wave portion 9 and the through-hole 12 be formed depending on the material of the partition plate 5.

As shown in FIG. 2, relatively rigid flange portions 2a and 3a are integrally formed in the outer peripheries of the two half cases 2 and 3. With the outer periphery of the partition plate 5 held between the two flange portions 2a and 3a, the two flange portions 2a and 3a are secured by screws, rivets, adhesive agent or the like. Each of the flange portions 2a and 3a of the two half cases 2 and 3 are integrally formed with outward tongues 2b and 3b at four positions. The shoulder belts 15 and the side belts 16 are inserted into belt receiving holes 2c and 3c formed in the corresponding tongues 2b and 3b for attachment (see FIG. 4).

Figure 5:
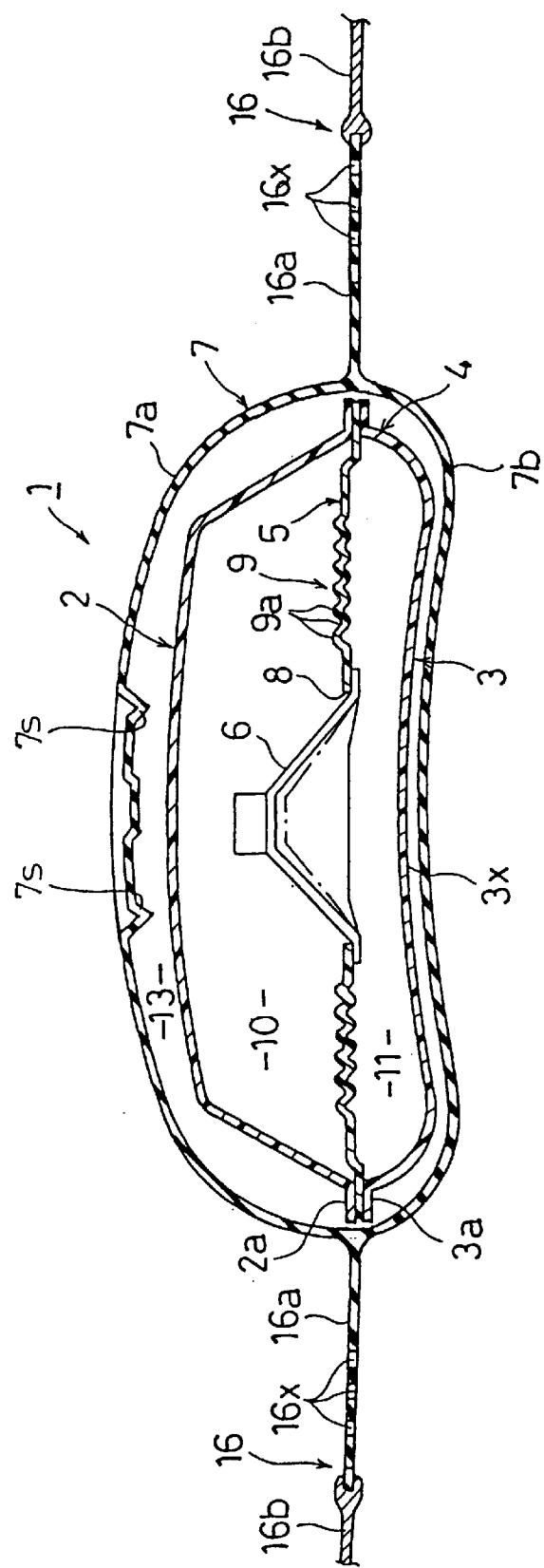
FIG. 5 is a vertical sectional view showing another example of attaching a body fitting belt of the body-acoustic device embodying the present invention.

In the above case, as shown in FIG. 5, the top cover member 7a and the bottom cover member 7b may be formed as an integral body which provides a holding case 7 for accommodating the container 4. According to such a structure, the shoulder belts 15 and the side belts 16 are connected to or integrated with both flanks of the holding case 7. By forming a door which can be opened and closed by a fastener or the like in a portion (for example, on the bottom) of the holding case 7, the container 4 can easily be brought into and out of the holding case 7, thereby facilitating the maintenance and the like can easily be performed.

As for the material of the holding case 7, a relatively soft material such as rubber or resin may be employed. The tension of the belts 15 and 16 acts on the holding case 7 when it is attached to the human body, the holding case 7 flexibly deforms to flatten the internal space of the holding case 7. As a result, the container 4 accommodated in the holding case 7 can be held without looseness. By accommodating the container 4 in the holding case 7, a sub-space 13 is formed between the top half case 2 and the surface wall, namely top cover member 7a, of the holding case 7. Note that the sub-space 13 is always maintained due to existence of inward projections 7s of the head-side cover member 7a projecting inwards even if the holding case 7 flattens under the tension. Due to the existence of the sub-space 13, sound leakage from the container 4 can be prevented. The container 4 which is accommodated in the holding case 7 may be formed by the bottm half case 3 and the partition plate 5. In this case, the top half case 2 may be omitted. The attachment of the top cover member 7a to the container 4 may be established by an engaging portion, such as an engaging pawl, formed in the periphery of the top cover member 7a for removal engagement with a receiving portion, such as an engaging recess, formed in the periphery of the container 4 can be engaged/separated. The top cover member 7a may be secured to the container 4 by screws, rivets, adhesive agent or the like. In this case, it is preferable that the sub-space 13 be a completely closed space. However, complete air tightness is not required.

Figure 7:
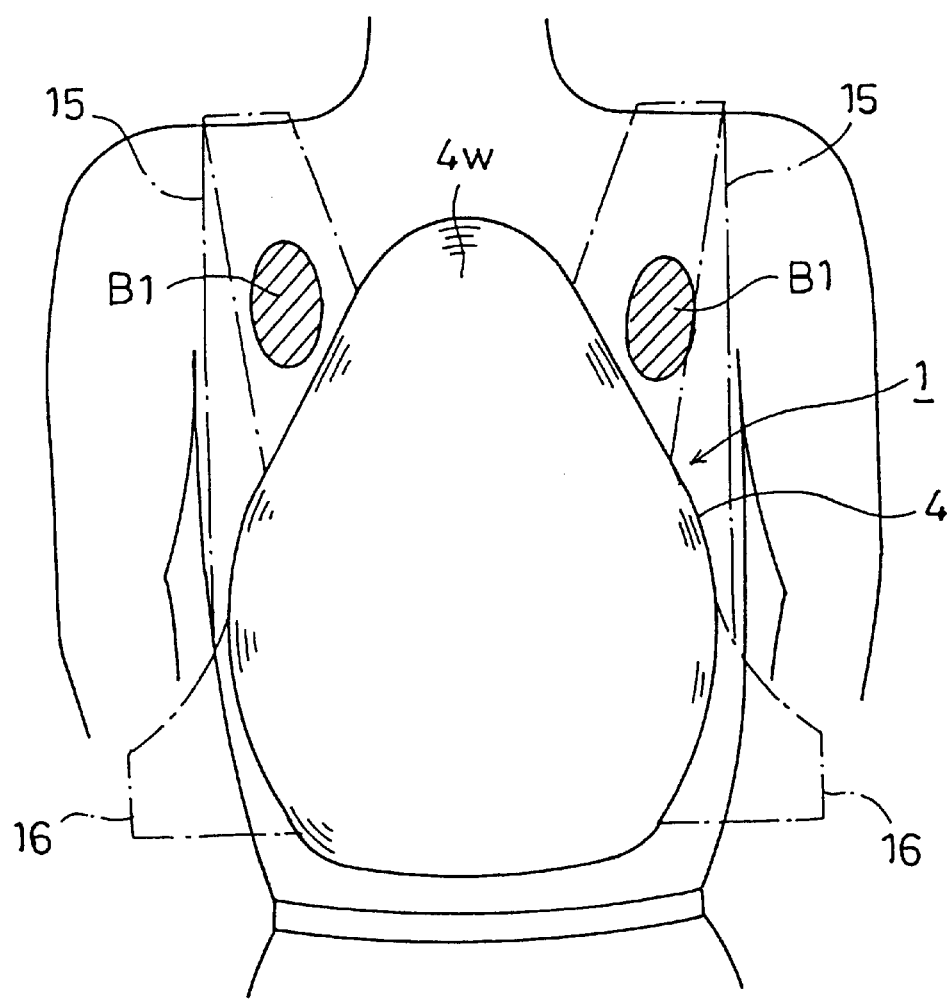
FIG. 7 is a schematic view showing the configuration of a container of the body-acoustic device embodying the present invention.

The container 4 is, as shown in FIG. 7, formed into a shape capable of preventing interference with the shoulder blades B1 of the user's back when the user carries the body-acoustic device 1 by means of the belts 15 and 16. Specifically, the width of the container 4 reduces in one direction (in upper direction in FIG. 7) from a generally central portion of the container 4 as viewed vertically. Therefore, an end 4w of the container 4 is interposed between the shoulder blades B1 when the user carries the container 4 on his or her back.

As a means for preventing interference between the container 4 and the shoulder blades B1, the width of the container 4 may be made smaller than the distance between the shoulder blades B1 over the entire length of the container. Alternatively, the length of the container 4 may made smaller than the distance between the waist portion and each shoulder blade B1. In the case where the bottom half case 3 is relatively deep, the container 4 may have a substantially rectangular shape covering the waist portion and the shoulder blades B1, and only the bottom half case 3 is depressed by cutting at portions corresponding to the shoulder blades B1.

As shown in FIGS. 1 and 4, each of the shoulder belts 15 and the side belts 16 has an expondable belt member 15a, 16a having an elastic expansibility like rubber as an end portion for connection to the container 4. The remaining portion of the belt is a non-expandable belt member 15b, 16b made of a non-expandable material, such as cloth, leather or resin. The elastic expandable belt member 15a, 16a has a multiplicity of through-holes 15x and 16x to provide air permeability. Note that each of the belts 15 and 16 may be made of a non-expandable belt member over its entire length.

Figure 8:
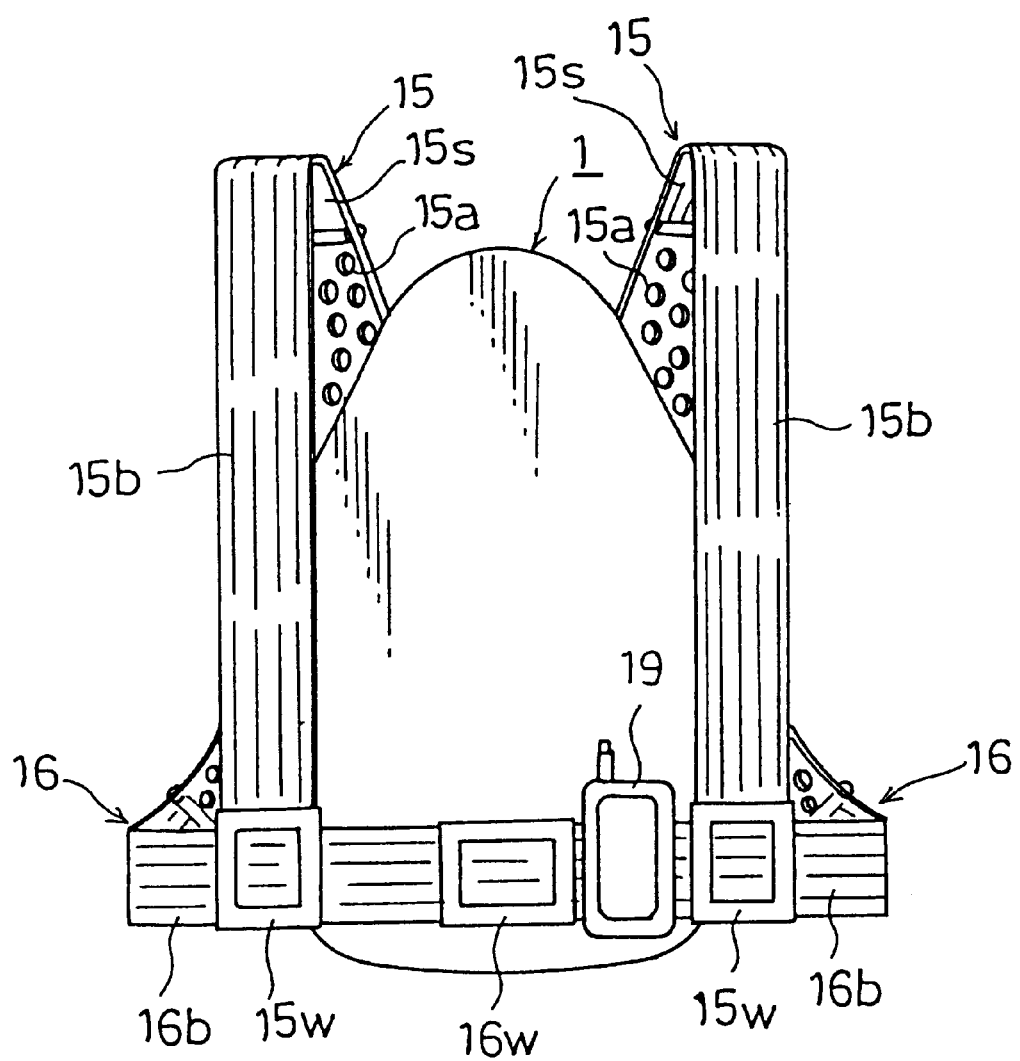
FIG. 8 is a bottom view showing the front side of the body-acoustic device embodying the present invention.
Figure 10:
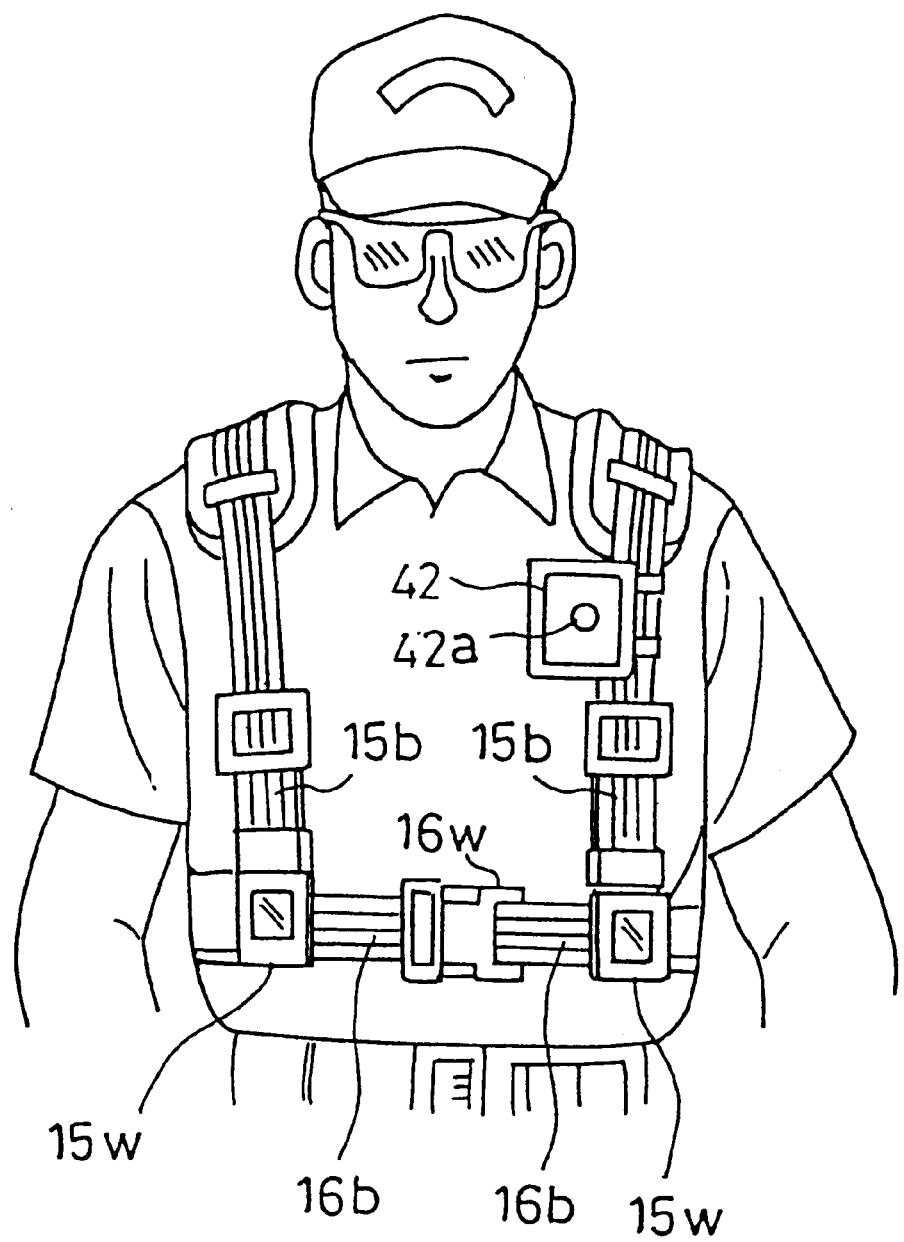
FIG. 10 is a schematic view showing the state where the body-acoustic device embodying the present invention is being used.

The remote ends of the non-expandable belt members 16b of the side belts 16 are, as shown in FIGS. 8 and 10, connected to each other by a buckle 16w at the central portion of the user's abdomen to tighten up around the abdomen. The non-expandable belt member 15b of each shoulder belt 15 is wound around the shoulder of the user for extending downward up to the abdomen, and has a remote end connected to the corresponding side belt 16 by means of a buckle 15w as spaced from the other shoulder belt. An amplifier 19 for amplifying acoustic signals supplied from a sound source to the speaker 6 is detachably attached to the non-expandable belt member 16b of one side belt 16, as shown in FIG. 8. Specifically, a bent engaging portion (not shown) disposed on the back side of the amplifier 19 detachably engages the side belt 16. It is preferable that a shoulder pad (not shown) made of sponge or rubber is attached to a portion 15s of the inner surface of each shoulder belt 15 which is brought into contact with the shoulder.

The elastic expandable belt members 15a and 16a of the belts 15 and 16 need not be disposed adjacent to a portion for connection with the container 4. Moreover, through-holes 15x and 16x similar to the foregoing holes may be formed partially or wholy in the non-expandable belt members 15b and 16b of the belts 15 and 16. Moreover, either one or both of the shoulder belts 15 and the side belts 16 may be wholy formed of the elastic expandable belt members 15a, 16a.

Regarding the material of the half cases 2 and 3 shown in FIGS. 1 to 5, the top half case 2 is hard or semi-hard, the bottm half case 3 is soft. Specifically, the top half case 2 is made of a material such as polypropylene or polyethylene to have a relatively thick wall, while the bottom half case 3 is made of a material such as polypropylene or polyethylene to have a relatively thin wall. In this case, since the bottom portion 3x of the bottom half case 3 is a portion for contact with the body of the user, it is preferable that this portion have a small wall thickness to flexibly deform slightly in addition to having a warped shape.

The background space 10 of the container 4 accommodates an amplifier for operating the speaker (not shown), a power supply cord and the like. The speaker 6 is supplied with signals in a low frequency region of 120 to 160 Hz for example which are obtained by passing audio signals transmitted from a game progression control means to a sound generating means through a low-pass or band-pass filter. It has been previously confirmed that the signals having the above low frequency region can be propagated as conformable vibrations for the body of the user.

On the other hand, the body-acoustic device 1 is connected to a game machine for business use or home use through the following signal transmission path.

Figure 11:
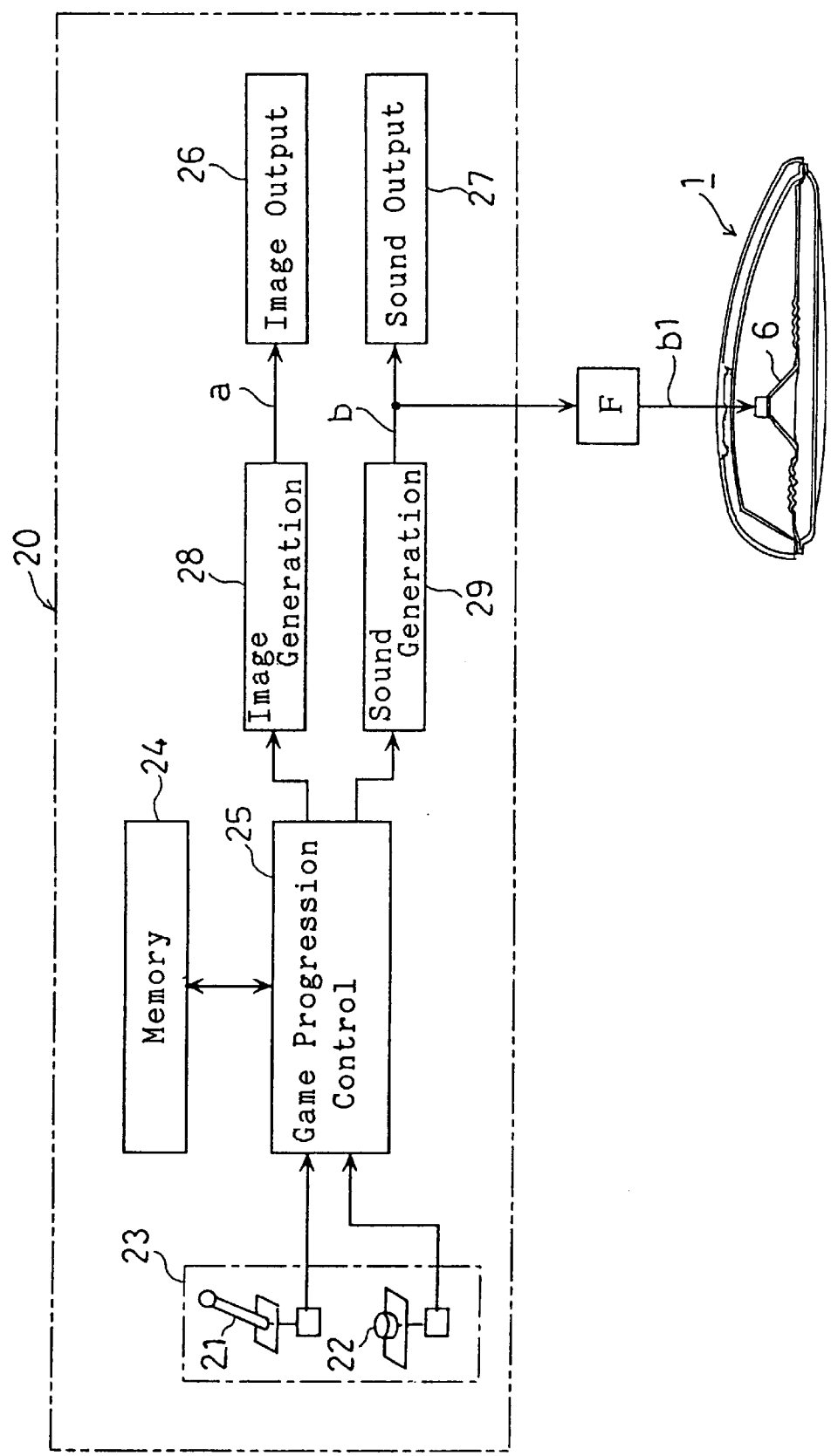
FIG. 11 is a schematic view showing the arrangement of a control system for the body-acoustic device embodiment the present invention.

As shown in FIG. 11, a game machine 20 for business use or home use comprises an input means 23 consisting of, for example, a lever 21 and depression button switches 22; a storage means 24 for storing various pieces of game information; a game progression control means 25 for determining and controlling the game progress in response to signals from the input means 23 and the storage means 24; and an image output means 26 as well as a sound output means 27 for transmitting images and sounds to the user in response to image signals (a) and acoustic signals (b) obtained in accordance with the signals supplied from the game progression control means 25.

More specifically, an image forming means 28 transmits image signals (a) in response to the signals from the game progression control means 25, while a sound generating means 29 transmits acoustic signals (b) in response to the signals from the game progression control means 25.

Moreover, the acoustic signals (b) from the sound generating means 29 are allowed to pass through a filter F which is a low-pass filter for input to the speaker 6 as drive signals b1. Further, an amplifier or the like is provided in the signal transmission path for performing predetermined signal amplification.

The filter F removes high frequency components from the acoustic signals (b) supplied by the sound generating means 29 for causing only signals having frequencies of 120 to 160 Hz to be supplied to the speaker 6 as the operation signals b1. If vibrations in a range of 100 Hz to 160 Hz are desired, a band-pass filter for selecting only signals of this frequency range as drive signals b1 may be used as the filter F.

The operation of the above-mentioned embodiment will now be described.

As shown in FIGS. 7 to 10, when the machine is fitted, the shoulder belts 15 and the side belts 16 are used to reliably hold the body-acoustic device 1 in contact with the back of the user. In this case, the overall region of the bottom portion 3x of the bottom half case 3 of the body-acoustic device 1 is brought uniform in contact with a wide region of the back of the user.

When the user suitably operates the input means 23 of the game machine 20 shown in FIG. 11, the image signals (a) and the acoustic signals (b), which progressively changes, are transmitted respectively to the image output means 26 and the sound output means 27 to proceed the game.

With the progress of the game, the acoustic signals (b) are transmitted from the sound generating means 29 in response to the signals supplied from the game progression control means 25, and the acoustic signals (b) is supplied to the speaker 6 through the filter F as the drive signals b1. Therefore, the speaker 6 is supplied with the drive signals b1 of the predetermined low frequency region.

In this way, low frequency sound pressure is generated by the speaker 6, and the sound pressure is then converted into pressure waves. Thus, air vibrations are generated in the sound generative space 11. The air vibrations are allowed to pass through the through-hole 12 (or the slit or the like) of the partition plate 5 for propagation to the background space 10. As a result, air vibrations are generated in the overall internal space of the container 4.

Simultaneously, due to the vibrations of cone paper of the speaker 6, the speaker 6 itself vibrates with flexible deflections of the wave portion 9 of the partition plate 5. As a result, even if the diameter of the speaker 6 is small, a sound pressure generation effect is attained as if the diameter of the speaker 6 has been enlarged, leading to generation of satisfactory high level sound pressure. Therefore, although the speaker 6 included in the body-acoustic device 1 has a small diameter because of the limitation of the installation space, satisfactory heavy bass sound can be generated.

The vibrations of the wave portion 9 of the partition plate 5 propagates directly to the bottom portion 3x of the bottom half case 3 so that the sum of the vibrations directly propagated from the wave portion 9 and the air vibrations generated due to the sound pressure is transmitted to the back of the user. Since the vibrations are generated in response to the acoustic signals in the predetermined low frequency region, the vibrations are felt comfortably by the user.

The vibrations thus generated in the bottom portion 3x of the bottom half case 3 is efficiently transmitted to the user's back held in uniform contact with the bottom portion 3x which is formed into the warped shape. Since the vibrations are generated due to the low frequency acoustic signals, the frequency of the vibrations transmitted to the user is desirable, body-acoustically.

Since the speaker 6 is elastically supported by the wave portion 9 of the partition plate 5, uncomfortable echo sound generated owing to splitting or distortion of the sound can be suitably absorbed by the flexible deflection of the wave portion 9. As a result, clearness of the sound can be improved.

In addition, the sound throttling effect attained when vibrating air is allowed to pass the through-hole 12 (or the slit or the like) of the partition plate 5 provides further intensification of the sound pressure.

Since the partition plate 5 itself includes the wave portion 9 as an elastic support member and the outer periphery of the partition plate 5 is directly secured to the container 4, the number of elements can be decreased in comparison with the conventional structure in which a partition plate is attached to a container via a buffer. Further, the partition plate 5 can easily be attached. Moreover, due to such a structure, the partition plate 5 is firmly attached to the container 4 to prevent separation of the partition plate 5 even if it is frequently vibrated.

Since the wave portion 9 is provided by the plurality of annular serrations concentric to the opening 8 for attaching the speaker 6, elastic deformation easily takes place in the wave portion 9 so that vibrations having a satisfactory large amplitude are generated. Further, the provision of the wave portion 9 in the partition plate 5 does not result in an undue decrease of strength, so that the partition plate is able to satisfactorily withstand vibrations.

In the case where at least a portion of the shoulder belts 15 and the side belts 16 for holding the container 4 is made of the elastic expandable belt members 15a and 16a, the degree of contact of the bottom portion 3x with the human back can be enhanced to improve the efficiency in transmitting vibrations. Further, even if the user inclines the body for operating a lever for example during a game, the bottom portion 3x can be always held in close contact with the user's back regardless of his or her posture, thereby enabling transmission of vibrations to the back of the user without difficulty.

In addition, the through-holes 15x, 16x formed in each of the belts 15 and 16 for ventilation appropriately restrains perspiration and stuffiness to prevent uncomfortable feeling after an energetic game.

Even if sound is continuously emitted from the speaker 6 to generate vibrations, the bottom portion 3x of the bottom half case 3 of the container 4 is held in contact with the back of the user so that sound emission from the bottom side to the outside is prevented by the back of the user.

On the other hand, since the top side of the top half case 2 is covered by the double-wall cover member 2, 7a with the interposition the sub-space 13, leakage of sound from the top side is also prevented. Specifically, since the top cover member 7a is made of rubber or the like to have a thin wall, sound or vibrations are absorbed by flexible deformation of the top cover member 7a as well as by the function of the air within the sub-space 13, so that even leakage of subtle sound is prevented. in the present embodiment, the mouth of the speaker 6 faces the bottom portion 3x of the bottom half case 3 to cause the sound pressure from the speaker 6 to be emitted toward the bottom portion 3x, the top side opposite to the bottom portion 3x is unlikely to be directly affected by the sound pressure. In addition, since the half case 2, which is the top side cover member, is hard or semi-hard, the structure itself of the body-acoustic device 1 is unlikely to permit outward leakage of sound from the top side.

In the above-mentioned embodiment, the present invention is applied to the rucksack-type body-acoustic device 1 which transmits vibrations to the back of the user. However, the present invention may be also applied to a body-acoustic device 1 of the following type.

Figure 17:
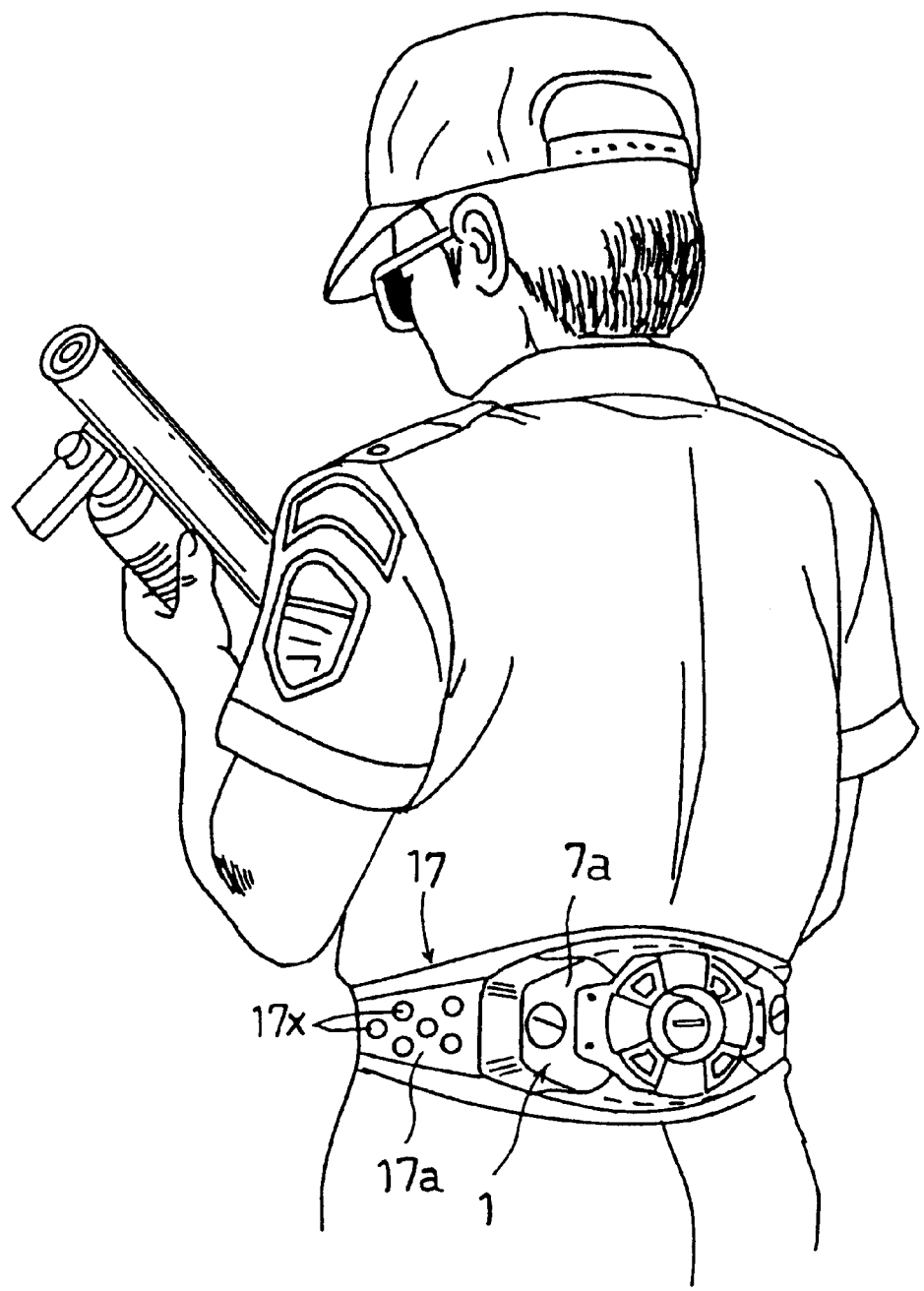
FIG. 17 is a schematic view showing a state where a body-acoustic device according to said another embodiment of the present invention is being used.

Specifically, as shown in FIG. 17, the present invention is applied to a porch type body-acoustic device 1 which is fitted to a waist portion of a user.

Figure 12:
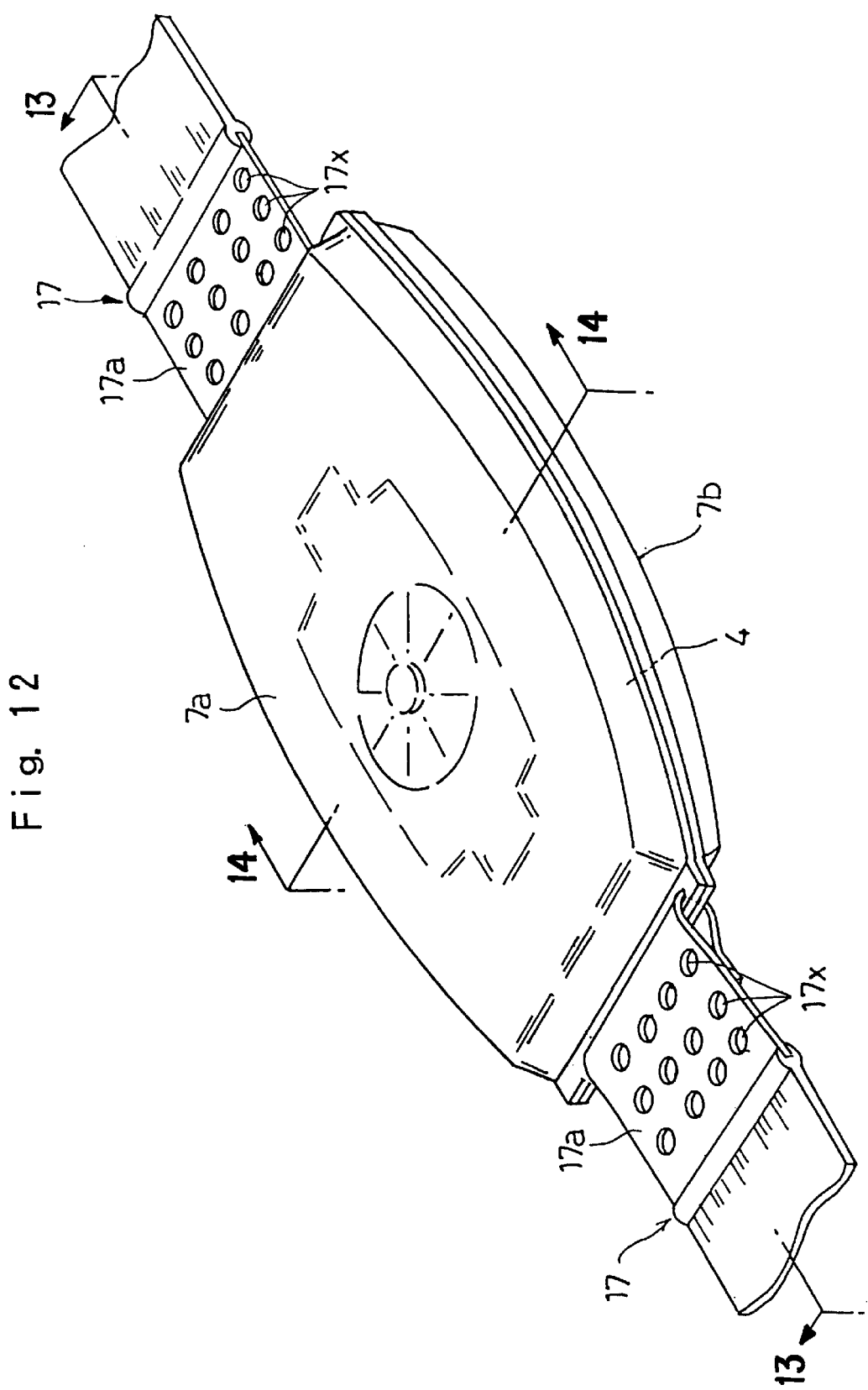
FIG. 12 is a perspective view showing the configuration of a body-acoustic device according to another embodiment of the present invention.
Figure 13:
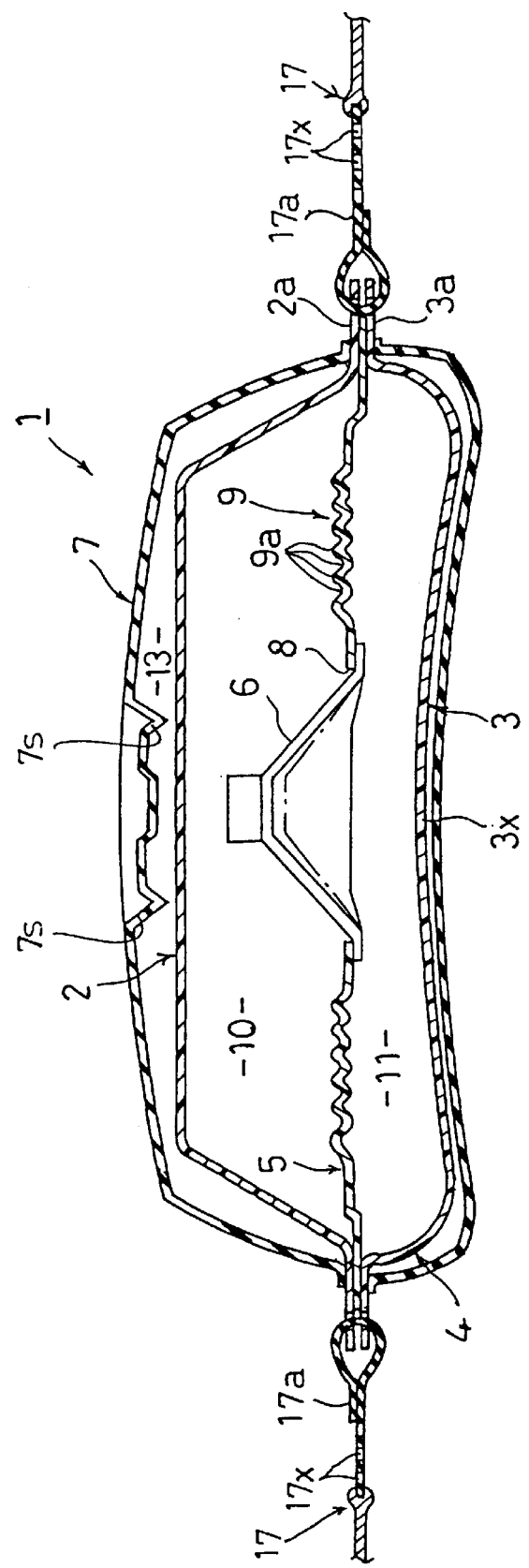
FIG. 13 is an enlarged vertical sectional view taken along lines C—C shown in FIG. 12.
Figure 14:
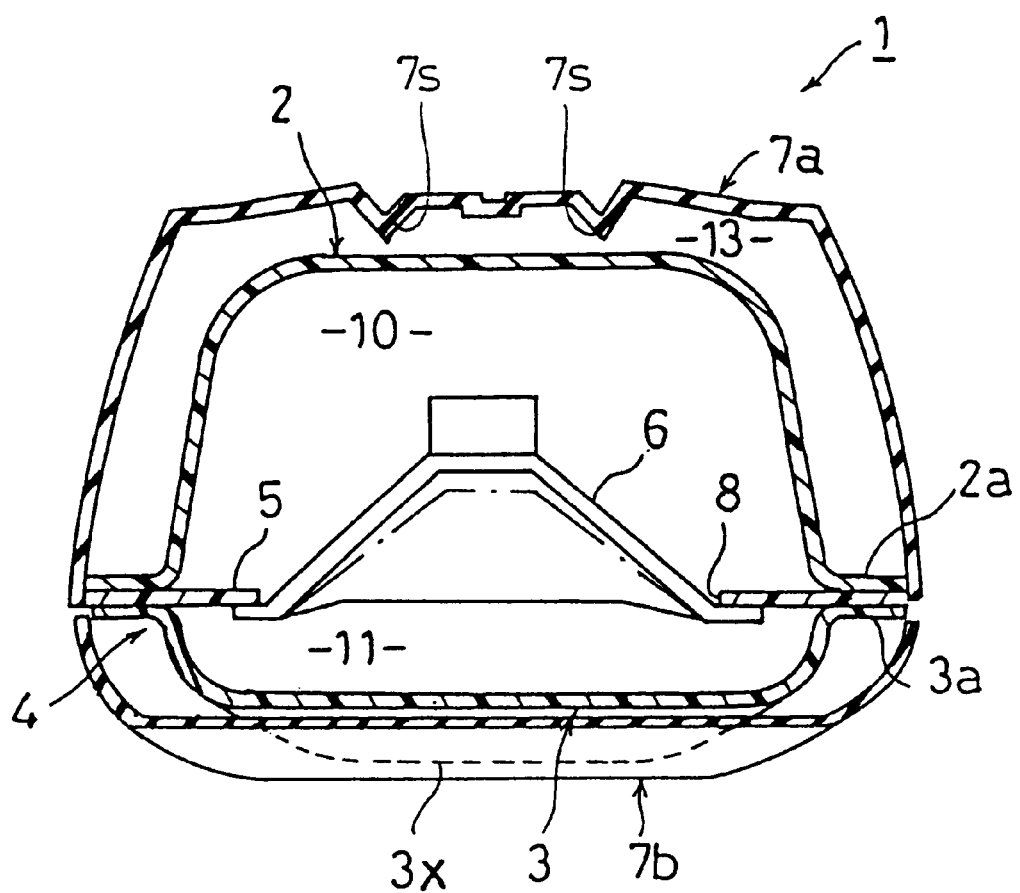
FIG. 14 is an enlarged vertical sectional view taken along lines D—D shown in FIG. 12.

As shown in FIG. 12, the body-acoustic device 1 is rectangular with two edges which are slightly warped. This embodiment is basically similar to the foregoing embodiment in that each of waist belts 17 attached to the body-acoustic device 1 includes an elastic expandable belt member 17a having through-holes 17x, as is also the case with the internal structure of the body-acoustic device 1, as shown in FIGS. 13 and 14. In this embodiment, two cover members 7a and 7b may be integrated to form a holding case 7 for accommodation a container 4 (see FIG. 15). Alternatively, a top half case 2 may be omitted and the container may be formed by a bottom half case 3 and a partition plate 5. Therefore, the elements of FIGS. 12 to 17 which are similar to those of the body-acoustic device 1 of the foregoing embodiment are denoted by the same reference numerals, and the description of such elements is omitted.

The body-acoustic device 1 is, as shown in FIG. 17, is brought into contact with a waist portion of the user by using the waist belts 17. For the same reasons as previously described, the degree of contact is enhanced when a portion of each waist belt 17 is formed by the elastic and expandable belt member 17a, and perspiration and stuffiness can be prevented when the through-holes 17x are formed in the waist belt 17.

Figure 15:
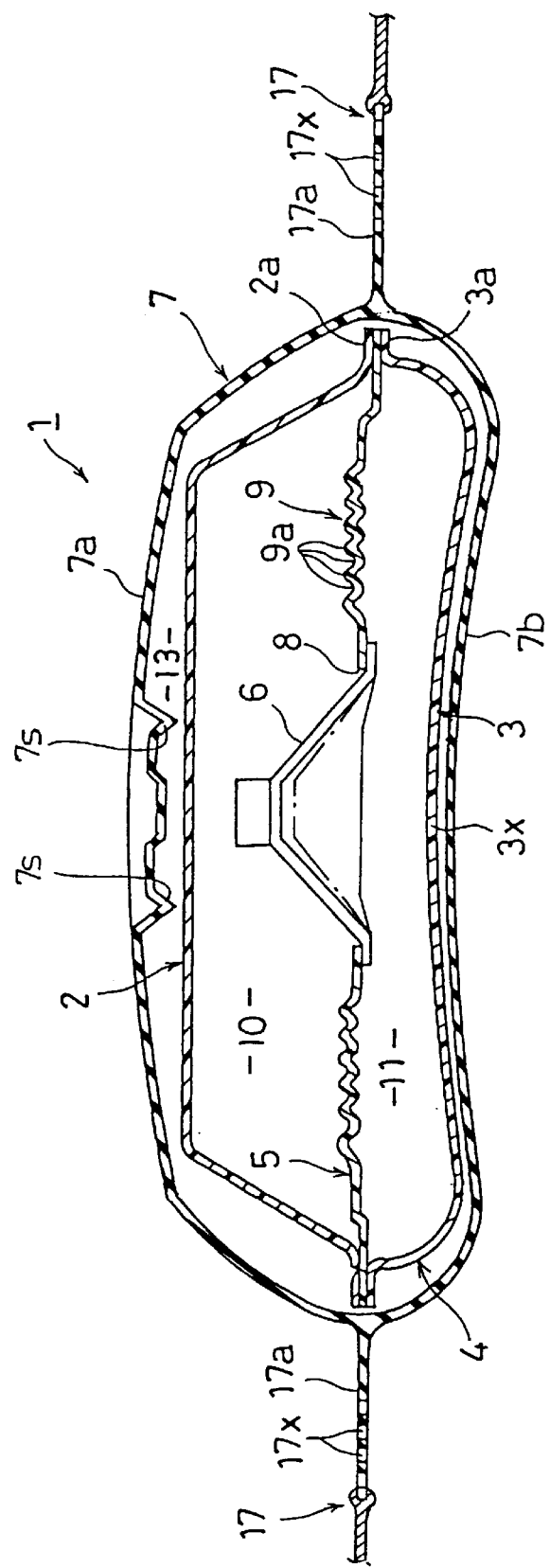
FIG. 15 is a vertical sectional view showing another example for attaching a body fitting belt of the body-acoustic device according to another embodiment of the present invention.

In particular, also in the body-acoustic device 1 according to this embodiment, as shown in FIGS. 13 or 15, the bottom portion 3x of the bottom half case 3 is warped to fit in shape to the waist portion of the human body so that the overall region of the bottom portion 3x is kept in close contact with the waist portion when the body-acoustic device 1 is fitted to the body.

Figure 16:
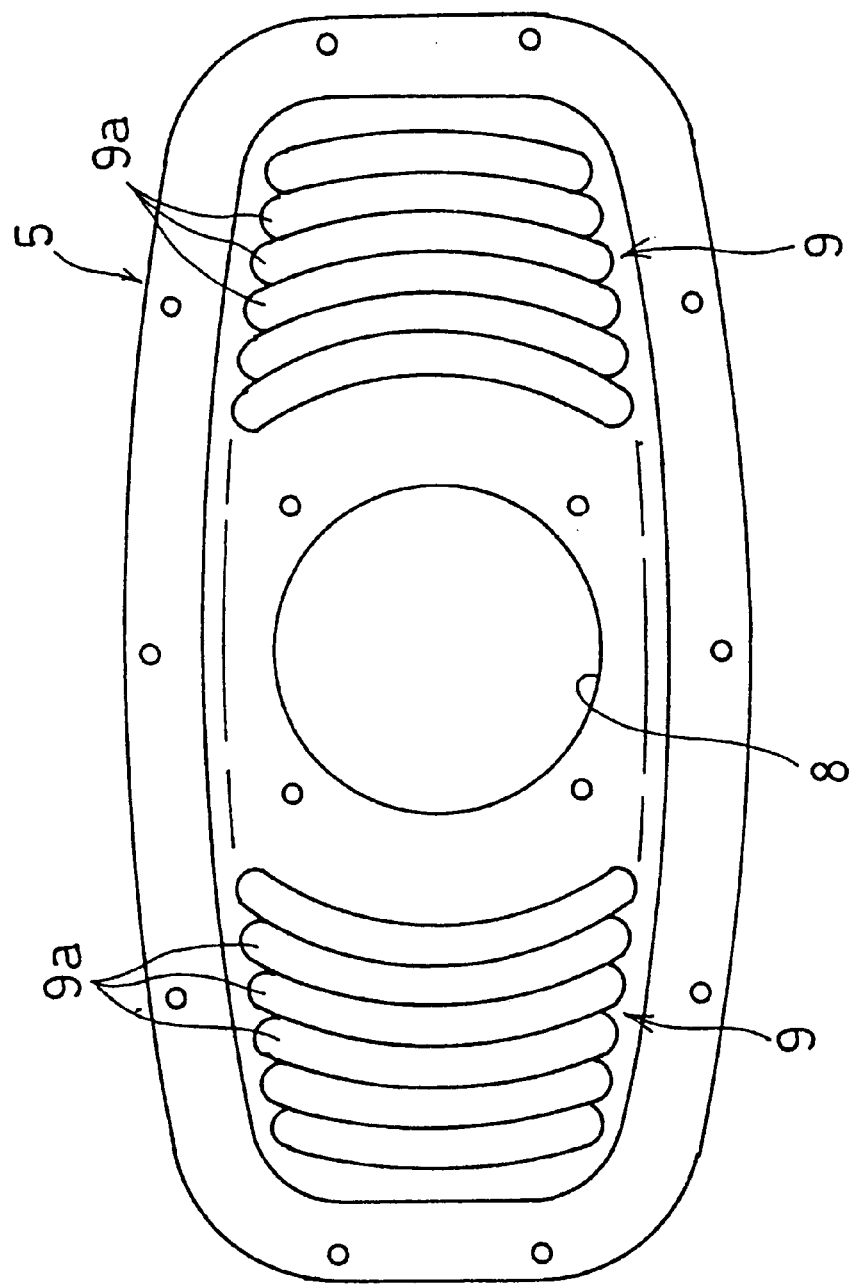
FIG. 16 is a plan view showing only a partitioning plate of the body-acoustic device according to said another embodiment of the present invention.

Moreover, as shown in FIG. 16, the opening 8 of the partition plate 5 is surrounded by a wave portion 9 which consists of a plurality of arcuate serrations concentric to the opening 8. The speaker 6 is elastically supported by the partition plate 5 due to the existence of the wave portion 9.

Since the body-acoustic device 1 of this embodiment is smaller than that of the foregoing embodiment, vibrations are concentratively transmitted to the waist portion via a smaller vibration transmissive surface if an identical speaker 6 is used. Therefore, locally intense vibrations can be obtained.

Similarly to the foregoing embodiment, the body-acoustic device 1 according to this embodiment provides advantages such as comfortable feel the user due to vibrations in the low frequency region alone, originality of the game by the help of vibrations, and reliable sound insulation realized by the double-wall cover member 2, 7a.

In each of the foregoing embodiments, the home-use or business-use game machine and the body-acoustic device 1 are connected to each other. However, similar advantages can be also obtained even if the body-acoustic device 1 is connected to an apparatus, other than a game machine, having a sound generating means.

Similarly to the foregoing embodiment, a variety of other advantages can be obtained.

Since the bottom portion 3x of the container forming the sound generative space 11 is warped as described above, the bottom portion 3x can be held in uniform contact with a contact portion of the human body when the body-acoustic device 1 is fitted to the human body. Therefore, vibrations generated in the bottom portion 3x of the container under sound pressure from the speaker 6 can be uniformly transmitted to enhance the efficiency of vibration transmission.

Due to the warping of the bottom portion 3x of the container, vibrations can be uniformly transmitted to a wide region of the back or waist of the user. Therefore, it is possible to increase the area of the bottom portion 3x for enlarging the total amount of vibrations to be transmitted.

Since the wave portion 9, which flexibly vibrates with the speaker 6, is formed at least in a portion of the partition plate 5, sound generated by the speaker 6 causes air vibrations in the container 4 for transmission to the bottom portion 3x of the container 4. At this time, the partition plate 5 for partitioning the internal space of the container portion also vibrates. Since a portion or whole of the partition plate 5 includes the wave portion 9 for elastic support of the speaker 6, uncomfortable noises generated due to distortion or split of sound can be appropriately absorbed by the flexible vibrations of the wave portion 9. As a result, the clearness of sound is effectively improved.

Since the elastic support portion provided by the wave portion 9 is formed in the partition plate 5, there is no need for additionally attaching a buffer made of rubber or the like, as opposed to the conventional structure. Therefore, the number of elements can be decreased to facilitate assembly while improving efficiency. Since the wave portion 9 can be formed by pressing the partition plate 5 without reducing the strength of the wave portion, satisfactory durability against frequent vibrations can be obtained.

Though the wave portion 9 of the partition plate 5 absorbs uncomfortable noises, the flexible vibrations of the wave portion 9 following the speaker 6 form part of vibrations to be transmitted to the bottom portion 3x of the container 4. Thus, the sum of air vibrations generated in the internal space of the container 4 under the sound pressure and the flexible vibrations of the wave portion 9 is transmitted to the bottom portion 3x of the container 4 and ultimately to the human body.

If the frequency of the air vibrations and that of the wave portion 9 matchs, resonance takes place to enlarge the amplitude. If the resonance is not accompanied by uncomfortable noises, body-acoustically preferable vibrations comfortable to the body can be expected.

Since the elastic support portion comprising the wave portion 9 is formed in the partition plate 5, the outer periphery of the partition plate 5 can be secured directly to the container. As a result, the partition plate 5 can be easily mounted to the container in firm attachment thereto. Therefore, even if vibrations are frequently generated, the partition plate 5 is unlikely to come off. Thus, the durability can furthermore be improved.

Further, the wave portion 9 consisting of the plural arcuate serrations which are concentric to the opening 8 for mounting the speaker 6 can easily undergo elastic deformation, as compared with a wave portion consisting of straight serrations for example. Therefore, vibrations with a sufficiently large amplitude can be generated by the wave portion 9.

When sound is generated by the speaker 6 with the container 4 held on the back or waist of the user by the fitting belts 15, 16, 17, the sound pressure from the speaker causes vibrations for transmission to the bottom portion 3x of the container 4. In the case where the body-acoustic device 1 is used in the above-described form of a rucksack, at least the bottom portion 3x of the container 4 is held out of contact with the shoulder blades B1 of the user's back. Therefore, the overall region of the bottom portion 3x can be brought into uniformly contact with the user's back. As a result, hinderance to transmission of vibrations, which occurs when the bottom portion 3x of the container 4 is partially in contact with the shoulder blades B, can be avoided.

In this case, only parts of the bottom portion 3x of the container 4 may be recessed to prevent interference with the shoulder blades B while the top portion may be formed regardless of the shoulder blades B. A preferred example may be as follows.

Specifically, the container 4 is configured to reduce in width toward one side. Due to such a configuration, a smaller width portion of the container 4 may be positioned between the shoulder blades B of the back without interferance therewith when the container 4 is fitted even if the thickness of the container 4 is small, and the capacity of the container 4 can be maximized. Therefore, vibrations can be transmitted to the back via a sufficiently large vibration transmission surface.

When through-holes 15x, 16x and 17x are formed at least in a portion of each body fitting belt 15, 16, 17, these through-holes 15x, 16x and 17x serve as vent holes. Therefore, perspiration and stuffiness attributable to close contact between the belts 15, 16, 17 and the surface of the user's body can be suitably prevented. Thus, comfortability in use can be improved.

Since at least a portion of each body fitting belt 15, 16, 17 are formed by the elastically expandable belt member 15a, 16a, 17a, the expandability causes the outer wall of the container 4 to be brought into close contact with the contact surface of the human body. As a result, vibrations of the bottom portion 3x of the container 4 generated due to the sound pressure are efficiently transmitted to the body. Thus, the efficiency in transmitting vibrations can be improved. If the user arbitrarily moves his or her body, the outer wall of the container 4 still maintains its contact with the user's body. Therefore, the user can enjoy the vibrations transmitted from the container 4 while having some freedom of movement without much restraint on the posture of the user.

Since the belts 15, 16 and 17 incorporate the elastic and expandable belt members 15a, 16a and 17a, vibrations are appropriately applied regardless of the body size and age while maintaining sufficiently close contact. When air vibrations are generated in the sound generative space 11 of the container 4 due to the emission of sound from the speaker 6, the air vibrations are transmitted to the bottom portion 3x of the container. In this case, though the sound emitted from the speaker 6 tends to pass through the surface wall portion of the container 4, namely, the partition plate 5, to the outside. However, since the surface portion of the container 4 is covered by the double-wall cover member 2, 7a, leakage of the sound to the outside is reliably prevented.

Specifically, since the bottom portion 3x of the container 4 is brought into contact with the human body, sound propagation from the bottom portion 3x is inhibited by the body. On the other hand, sound emission from the surface portion is inhibited owning to the synergistic effect of the sound insulation of the cover member 2, 7a and the sound absorption by the air in the sub-space 13.

By forming at least the cover member 2, 7a in the surface portion by a thin elastic member, the cover member 2, 7a is easy to elastically deform for suitably absorbing sound to prevent leakage of subtle sound to the outside.

On the other hand, the filter F comprising a low-pass filter or a band-pass filter removes at least high frequency components of the acoustic signals (b) transmitted from the sound generating means 29 to the speaker 6 through the signal transmission path. Therefore, only acoustic signals in a required frequency region, particularly a low frequency region, are transmitted to the speaker as the operation signals b1. Air vibrations generated due to the low frequency sound will be inevitably composed only of low frequency components. The low frequency vibrations are transmitted from the bottom portion 3x of the container 4 to the human body.

To select a frequency region particularly preferable for the body feeling, a band-pass filter capable of cutting a super low frequency region may be employed as the filter F.

The game machine 20 is provided with the sound generating means 29 for transmiting the sound signals to the sound output means 27 in response to the signals from the game progression control means 25. Therefore, in connecting the body-acoustic device 1 to the game machine 20 for actual use, it is preferable to ensure that the acoustic signals (b) transmitted from the sound generating means 29 are supplied to the speaker 6 through the filter F.

In this way, the user can enjoy the image and sound outputs of the game machine 20 during the game while comfortably feeling vibrations generated due to the low frequency sound.

Figure 18:
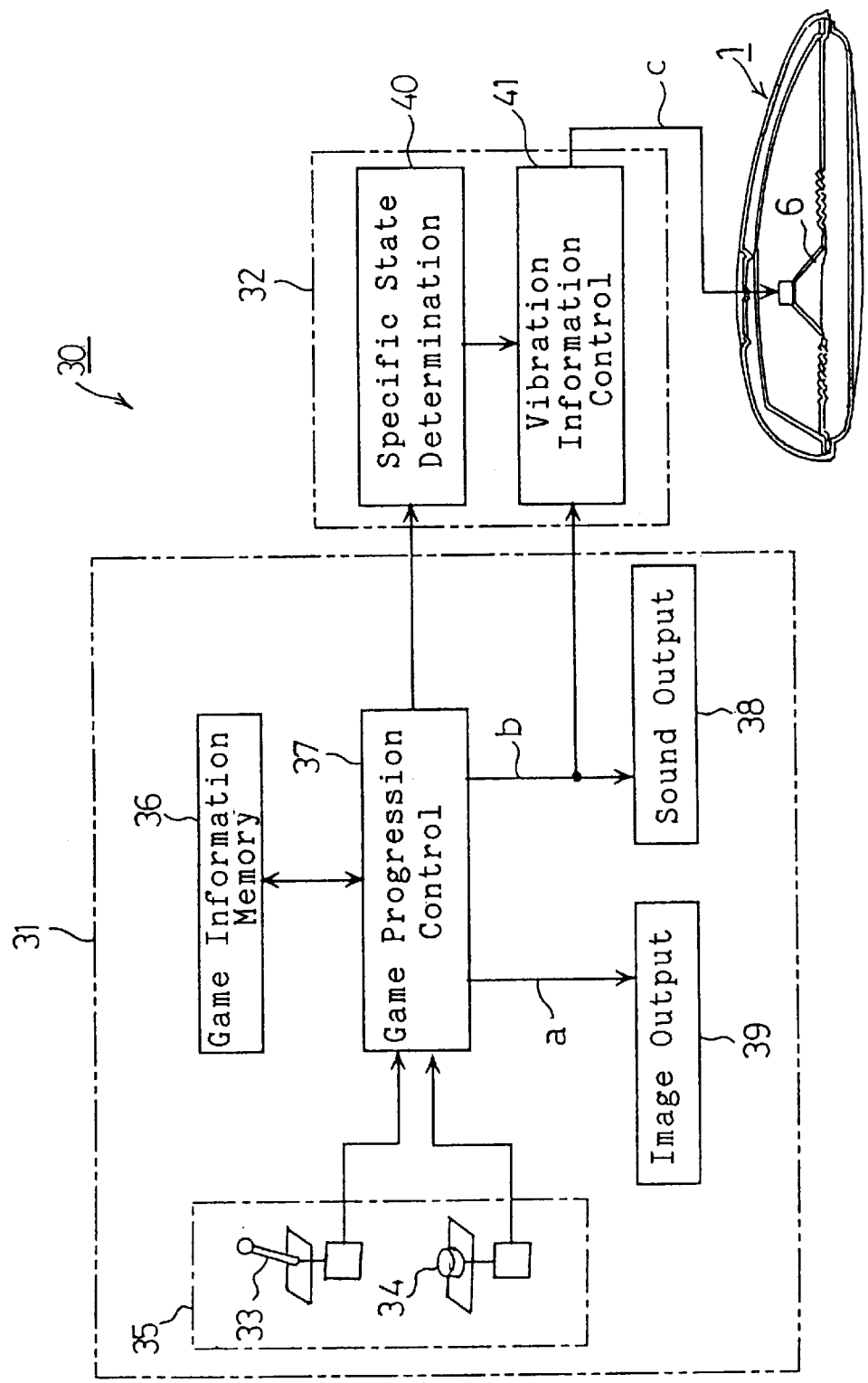
FIG. 18 is a schematic structural vie showing the basic arrangement of a playing apparatus according to an embodiment of the present invention.

FIG. 18 is a block schematic diagram showing the arrangement of another playing apparatus embodying the present invention. As illustrated, the playing apparatus 30 mainly comprises a body-acoustic device 1 as a vibration generating means, a game machine 31 for home or business use, and a control means 32 for controlling the body-acoustic device 1 in response to output signals from the game machine 31.

Specifically, the game machine 31 comprises an input means 35 including, for example, a joy stick lever 33 and a depression button switch 34; a game information storage means 36 for storing various pieces of game information; a game progression control means 37 for determining or controlling the progress of the game in response to signals supplied from the input means 35 and the game information storage means 36; a sound output means 38 for receiving acoustic signals (b) supplied from the game progression control means 37 for emitting audible sound to a user; and an image output means 39 which receives image signals (a) supplied from the game progression control means 37 for displaying images for the user.

On the other hand, the control means 32 comprises a specific state determining means 40 for determining, in response to the signals supplied from the game progression control means 37, whether not a character image operated by the player via the input means 35 during the game is in a specific state; and a vibration information control means 41 for suitably processing the acoustic signals (b) in response to the signals from the specific state determining means 40 and for transmitting the processed signals to the speaker 6 of the body-acoustic device 1 as vibration information signals (c).

The specific state determining means 40 determines, for example, whether the character operated by the player during the game is in a dangerous state or a safe state, or alternatively whether the character is in an advantageous state or a disadvantageous state. If a determination is made that the state is dangerous or advantageous, the vibration information control means 41 supplies the body-acoustice device 1 with vibration information signals (c) which are not otherwise sent.

In this case, the vibration information signals (c) transmitted from the vibration information control means 41 differ from the image signals (a) transmitted from the game progression control means 37 to the image output means 39. Therefore, information which cannot be recognized by simply looking at the image generated by the image output means 39 such as a CRT or an LCD is transmitted to the speaker 6 of the body-acoustic device 1.

The vibration information signals (c) may be such as to cause intermittent vibrations. In this case, the vibration information signals (c) may include data for generating different cycle periods (vibration generating cycle time), or for generating different frequencies or amplitudes.

Though not shown, a plurality of, e.g. two, input means 35 may be provided to enable two players to independently operate the input means 35. In this case, the specific state determining means 40 is designed to individually determine the states of the two or more characters operated by two or more players. Moreover, the vibration information control means 41 transmits two different kinds of vibration information signals (c) to two body-acoustic devices 1 in accordance with the respective results of the determination performed by the specific state determining means 40. The "L" and "R" sides of stereo sound may be preferably utilized as a method for transmitting different kinds of vibration information signals (c) to the two body-acoustic devices 1 corresponding to the two players.

The playing apparatus 30 having the above arrangement may be used as follows.

Figure 19:
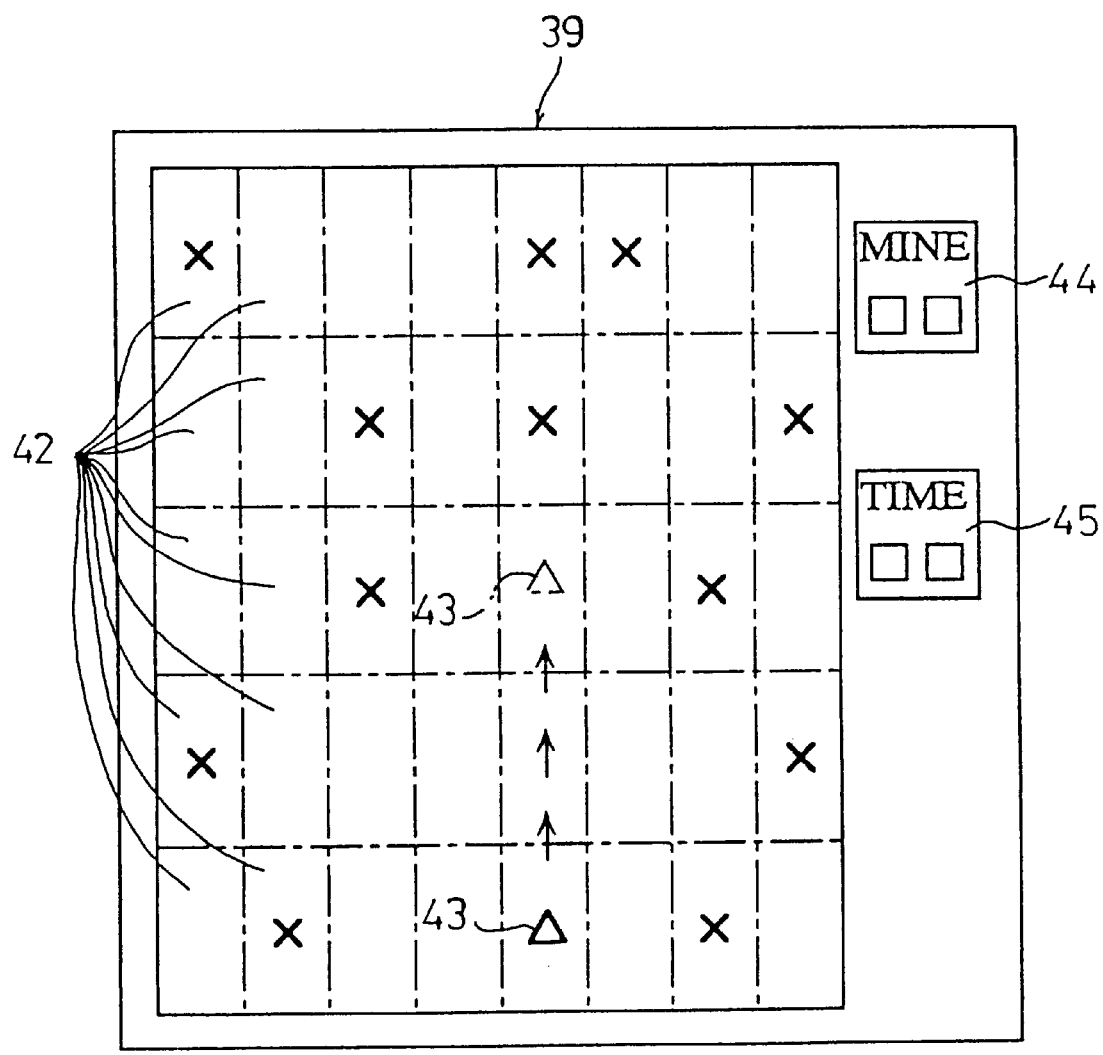
FIG. 19 is a schematic view showing an example of a game which is played by using the playing apparatus embodying the present invention.

Specifically, as shown in FIG. 19, a predetermined display region of the image output means 39 is imaginarily divided vertically and horizontally into a predetermined number of blocks 42. It is now assumed that land mines are embedded in those of the blocks 42 indicated by symbol X. However, the land mines X are not displayed as an image. Therefore, the player cannot recognize which of the blocks 42 the land mines X are embedded in.

Under the above-described condition, the player suitably operates the input means 35 to movably manipulate the specific character 43 shown in FIG. 19. When the character 43 moves to a block adjacent to any block 42 in which a land mine X is embedded as indicated by chain lines, the specific state determining means 40 determines that the state of the player is dangerous. In the illustrated example, the character is assumed to move vertically to a block adjacent to the block 42 with the land mine X. However, the specific state determining means 40 determines that the player is in a dangerous state even if the character is made to move laterally to an adjacent block.

Upon such determination of the dangerous state, the vibration information control means 41 processes the acoustic signals (b) in a predetermined manner in response to the signals supplied from the specific state determining means 40 and transmits acoustic signals in a non-audible low frequency region to the speaker 6 of the body-acoustic device 1 as vibration information signals (c). In this case, the specific state determining means 40 may determine whether the character 43 approaches a land mine X or moves away from the same. If the character approaches the land mine X, the intermittent cycle period of the low-frequency acoustic signals is made to gradually decrease to cause more frequent vibrations as the distance from the land mine gets shorter. Conversely, if the character moves away from the land mine, the intermittent cycle period may be made to gradually increase to cause less frequent vibrations as the distance from the land mine gets longer. In other words, an atmosphere is created in which the degree of approach toward the land mine X and the heart beat of the player is made to coincide.

When the non-audible acoustic signals are transmitted to the speaker 6 of the body-acoustic device 1 as vibration information signal (c), the speaker 6 generates sound pressure which causes vibrations to be generated in a portion of the body-acoustic device 1 held in contact with the human body. The generated vibrations are transmitted to the body of the player carrying the body-acoustic device 1 so that the player recognizes the approach of the character toward the land mine X. Therefore, the character 43 is simulated to carry a mine sweeper having a vibration type mine detector.

Upon recognition that the character 43 has most closely approached the land mine X, the player operates the input means 35 for causing the character 43 to excavate the land mine X by using the mine sweeper. A first display portion 44 to the right of the display region displays the total number of excavated land mines X, and a second display portion 45 displays a remaining time of the limit.

Therefore, a game can be enjoyed wherein the players compete with respect to the number of land mines X evacuated in a limit time. In this game, if the player hastily moves the character 43 for evacuating more land mines X, the character 43 may ride on the land mine X to trigger an explosion. Also in the event of such an explosion, the specific state determining means 40 detects another specific state, thereby causing the vibration information control means 41 to transmit vibration information signals (c) required for generating large-amplitude vibrations. As a result, correspondingly explosive vibrations with a large amplitude are transmitted from the body-acoustic device 1 to the player's body to simulatively experience a large explosion.

Even if the player recognizes a maximal approach of the character 43 toward a land mine X due to vibrations, the player may not be able to determine whether the land mine X is located in front, to the right or to the left of the character 43. Therefore, the number of evacuated land mines X depends the judgment of the player. This also increases the interest of the game.

If desired, a time competition game may be played wherein each player advances from a starting point to a goal while excavating the land mines X.

In this case, if two input means 35 are provided to perform the previously described control, the game of competitively evacuating the land maines X may be enjoyed by two players in secrecy to the competitor.

In another example of using the playing apparatus 30, the predetermined display region is imaginarily divided into plural blocks, similarly to the example shown in FIG. 19. Trapping treasure boxes (e.g. an enemy hidden in the box) and nontrapping treasure boxes may be arranged at randomly selected ones of the blocks in such a manner that they are indistinguishable in the image. When the character makes a near approach or a gradual approach to a trapping treasure box, such a state is detected by the specific state determining means 40 which, as a result, causes the vibration information control means 41 to transmit corresponding vibration information signals (c). As a result, the player is able to recognize, in secrecy against the outside, an approach toward the trapping treasure box due to vibrations from the body-acoustic device 1.

In this case, each block 42 represents a room. Thus, if the character is made to enter each room through a door by way of passages, such as corridors, disposed at predetermined positions as images, the body-acoustic device 1 to generate vibrations in response to the vibration information signals (c) with a message, e.g. "the rear door has suddenly shut", after the moving character has entered the room. In such an event, the sudden shutting of the door is communicated as the vibrations transmitted to, for example, the back of the user, thereby giving a high reality.

Another example of using the playing apparatus 30 is a treasure tracing game wherein the player tries to find out the place which is not recognizable in the image and at which a treasure is hidden. If the moving character approaches the treasure, the specific state determining means 40 determines this to be an advantageous state for causing transmission of vibration information signals (c) in response to the determination. As a result, the player is able to recognize the advantageous state in secrecy.

The vibration information signals (c) thus transmitted should preferably lie in a frequency region not higher than 120 to 160 Hz for preventing other persons for hearing.

According to the arrangement of the playing apparatus 30 shown in FIG. 18, the acoustic signals (b) transmitted from the game progression control means 37 to the sound output means 38 are effectively converted to vibration information signals (c). Therefore, the vibration information control means 41 comprises a low-pass filter, a band-pass filter and/or an amplifier. However, the present invention is not limited to such an arrangement. A sound source for generating vibrations may be provided separately from the sound source for the game machine 31 so as to separate the vibration information signals (c) from the transmission path for the acoustic signals (b).

The body-acoustic device 1 as the vibration generating means may be replaced by a vibration generating device of the type wherein a vibration plate or the like is vibrated by excitation and non-excitation of e.g. a solenoid. The vibration information control means 41 controls the solenoid for excitation and non-excitation in response to the signals from the specific state determining means 40.

Figure 9:
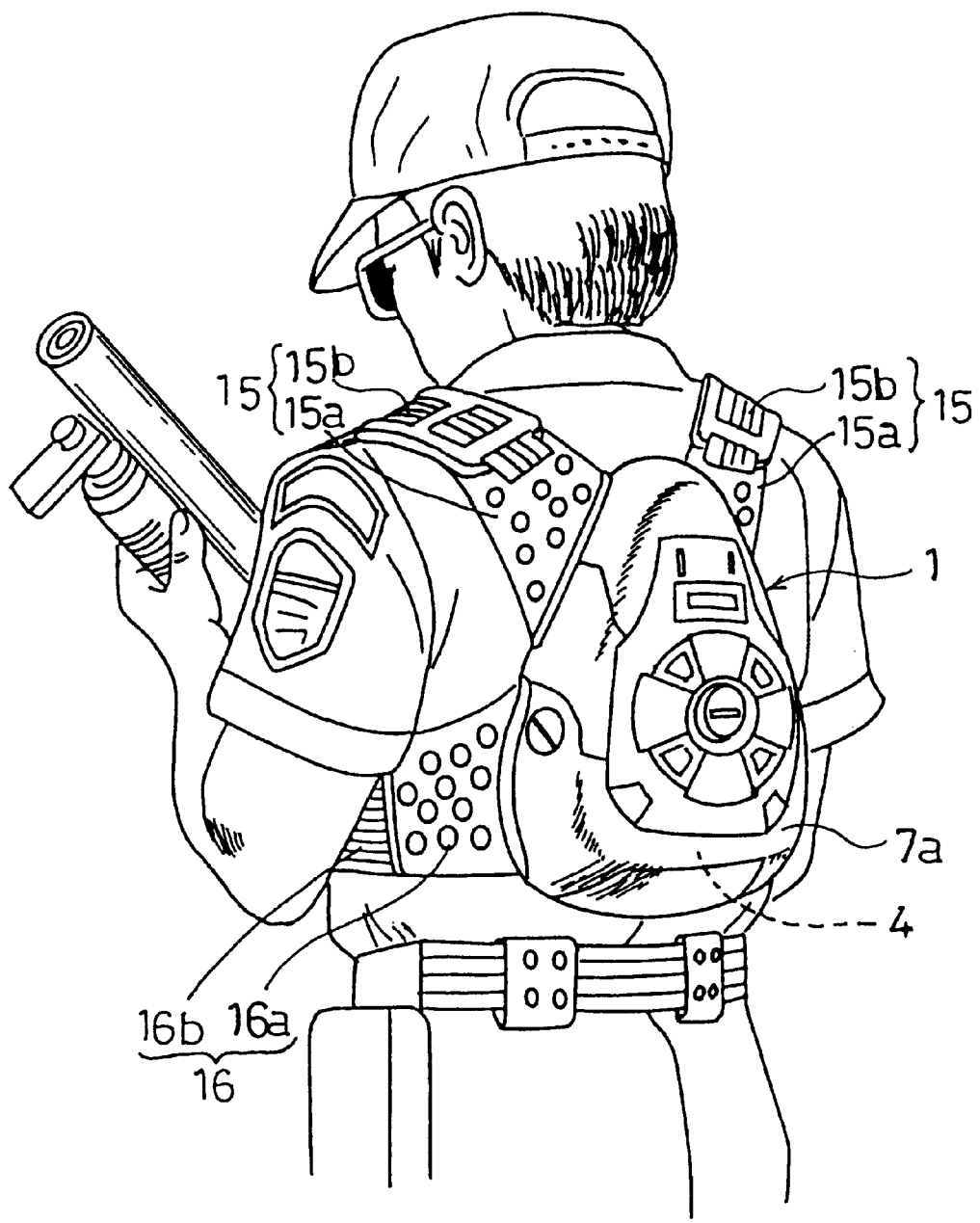
FIG. 9 is a schematic view showing a state where the body-acoustic device embodying the present invention is being used.

When the player operates the input means 35 shown in FIG. 18 with the body-acoustic device 1 carried on the back of the user as shown in FIG. 9, the game using the land mines X or the treasure box or the treasure hunting game may be played in accordance with the operations of the above-mentioned game machine 31, the specific state determining means 40 and the vibration information control means 41.

The vibration information signals (c) transmitted as a result of the specific state determination performed during the game by the specific state determining means 40 are supplied to the speaker 6 for generating predetermined vibrations. The vibrations are generated in the following manner.

Specifically, the vibration information signals (c) transmitted from the vibration information control means 41 are converted into acoustic signals in a low frequency region for feeding to the speaker 6. As a result, sound pressure is generated by the speaker 6, and the sound pressure is formed into pressure waves having a low frequencies for direct transmission to the bottom portion 3x of the bottom half case 3 or for generating air vibrations in the sound generative space 11. The generated air vibrations are allowed to pass the through-hole 12 (or the slit or the like) of the partition plate 5 so as to be transmitted to the background space 10. As a result, air vibrations are generated in the overall internal space of the container 4.

Moreover, vibrations of the cone paper of the speaker 6 causes the speaker 6 to vibrate with flexible deformation of the wave portion 9 of the partition plate 5. As a result, a sound pressure amplifying effect can be obtained as if the diameter of the speaker 6 has been enlarged though it is actually a small size, thereby generating sound pressure having a satisfactory high level. Therefore, the speaker 6 included in the body-acoustic device, though 1 having a small diameter due to the limitation of installation space, is able to generate a heavy-duty bass sound.

As described above, sufficient vibrations are transmitted from the bottom portion 3x of the body-acoustic device 1 to the back of the user playing the game. As a result, the player is able to play the game with a high degree of reality while enjoying thrill and tremendous impact in secrecy.

In the foregoing embodiment, the playing apparatus 30 according to the present invention incorporates the rucksack type body-acoustic device 1 which transmits vibrations to the back of the player. However, use may be made of a body-acoustic device 1 of the following type.

Specifically, as shown in FIG. 17, the body-acoustic device 1 is fitted to the waist of the player by using waist belts 17.

The body-acoustic device 1 has a shape formed into a rectangular shape as shown in FIG. 12 such that the two side ends are slightly warped. The structure in which the waist belt 17 to be attached to the body-acoustic device 1 has the elastic and expandable belt member 17a having the through hole 17x and the internal structure of the body-acoustic device 1 are basically the same as those of the foregoing embodiment, as shown in FIGS. 13 and 14. Also this embodiment may be structured such that the two cover members 7a and 7b are integrated to form the holding case 7 and the container body 4 is accommodated in the holding case 7 (see FIG. 15). As an alternative to this, the right side halved case 2 may be omitted and the container body 4 may be formed by the reverse side halved case 3 and the partition plate 5. Therefore, common elements shown in FIGS. 12 to 17 to those of the body-acoustic device 1 of the above-mentioned embodiment are given the same reference numerals and the common elements are omitted from description.

Since the body-acoustic device 1 is smaller than the body-acoustic device according to the foregoing embodiment, the body-acoustic device 1 enables vibrations to concentrically be transmitted to the waist portion through the vibration transmissive surface having a smaller area if the same speaker 6 is used. Therefore, locally intense vibrations can be obtained.

Whichever of the foregoing body-acoustic device 1 is used, the vibration information control means 41 including an amplifier, a sound source or a solenoid and a filter, as well as the specific state determining means 40 including an IC circuit or a microcomputer may be included in a single small case to form a unit, and the small case may be fitted to the player by using the body fitting belts 15, 16 and 17.

When the player operates the input means 35 as described above, the image output means 39 displays a progressively changing image during the game in response to the signals from the game progression control means 37. In this case, the player takes part in the game by operating the input means 35. Specifically, if a character 43 such as the image of a human being manipulated in accordance with the operation of the input means 35 exists in the image which is displayed by the image output means 39, the player takes part in the game by manipulating the character 43 as intended.

The specific state determining means 40 determines the state of the player, that is, whether or not the character 43 operated by the player is in a specific state in response to the signals supplied from the game progression control means 37 during the game. Upon determination of the specific state, the vibration information control means 41 transmits information, which is not included in the image signals (a), to the speaker 6 as the vibration information signals (c).

As a result, the contents, which are not displayed by the image output means 39, are reproduced by the speaker 6 as vibrations. Therefore, when the body-acoustic device 1 is brought into contact with the body of the player, the player is able to feel the generated vibrations during the game so that the player recognizes that the progress of the game is in a specific state. On the other hand, the other players and the surrounding onlookers cannot recognize the specific state only by viewing the image.

As a result, the player is able to play the game in secrecy. Moreover, since the vibrations can bodily be sensed, the game can be enjoyed with a high degree of reality.

When the structure is arranged such that information, which is not transmitted in a case where the situation of the player is not dangerous, is transmitted from the vibration information control means 41 to the speaker 6 as the vibration information signals (c) if the specific state determining means 40 has determined that the situation of the player is dangerous during the process of the game, the player is able to recognize that the player is in a dangerous state in accordance with the vibrations. Thus, the real atmosphere of crisis can be transmitted so that advanced reality and thrill are realized. By making the characteristics of the vibrations generated at this time to be matched to the dangerous state, the foregoing effect is furthermore improved.

When the structure is formed such that the game progression control means 37 does not transmit the image signal denoting the dangerous state to the image output means 39 when the dangerous state has been determined, the game can be allowed to proceed in the secret state. Thus, the game can be manufactured more freely and the contents of the game can be selected more widely.

When the structure is arranged such that information, which is not transmitted in a case where the situation of the player is not advantageous, is transmitted from the vibration information control means 41 to the speaker 6 as the vibration information signals (c) if the specific state determining means 40 has determined that the situation of the player is advantageous during the process of the game, the player is able to recognize that the player is in a advantageous state in accordance with the vibrations. Thus, the player is able to feel the real atmosphere of advantage. When the structure is arrange such that the image signal denoting the advantageous state at this time is not transmitted, the player is able to play the game in such a manner that the advantageous state cannot be recognized by other persons. Thus, the game can be manufactured more freely and the contents of the game can be selected more widely.

If the state of the game is being changed in accordance with a predetermined rule in a case where the state of the game is changed every moment, the specific state determining means 40 determines the state is in the specific state. In accordance with the determination, the vibration information signals (c) corresponding to the state of change in the game, for example, the vibration information signals (c) for enlarging the amplitude of the vibrations or shortening the generation period of the vibrations is arranged to be transmitted. Thus, the player is able to feel further improved reality and thrill.

In a case where two players compete in playing a game, the specific state of a character 43 which is being operated by one player and that of a character 43 which is being operated by another player are individually determined. In accordance with a result of the determination, the vibration information signals (c) are arranged to be transmitted to different speakers 6. Thus, the two players are able to bodily sense the different vibrations at different moments and information of the vibrations can be kept secret for the other player when the game is allowed to proceed by the players.

In the foregoing case, a structure in which a vibration plate is caused to generate vibrations in accordance with whether a solenoid is excited/non-excited may be employed in place of the speaker 6. If the body-acoustic device 1 is used, sound generated from the conventional game machine can effectively be used.

In a case where the body-acoustic device 1 is used, the acoustic signals (b) in a predetermined low frequency region is arranged to be transmitted so that vibrations having non-audible characteristic are generated. Thus, a requirement for causing the game to proceed in a secret state can appropriately be satisfied. In this case, it is preferable that the "R" side and the "L" side of stereo sound are used to transmit different acoustic signals B to the body-acoustic devices 1 corresponding to the two players so as to transmit different vibration information signals (c) to the two body-acoustic devices 1.

Figure 20:
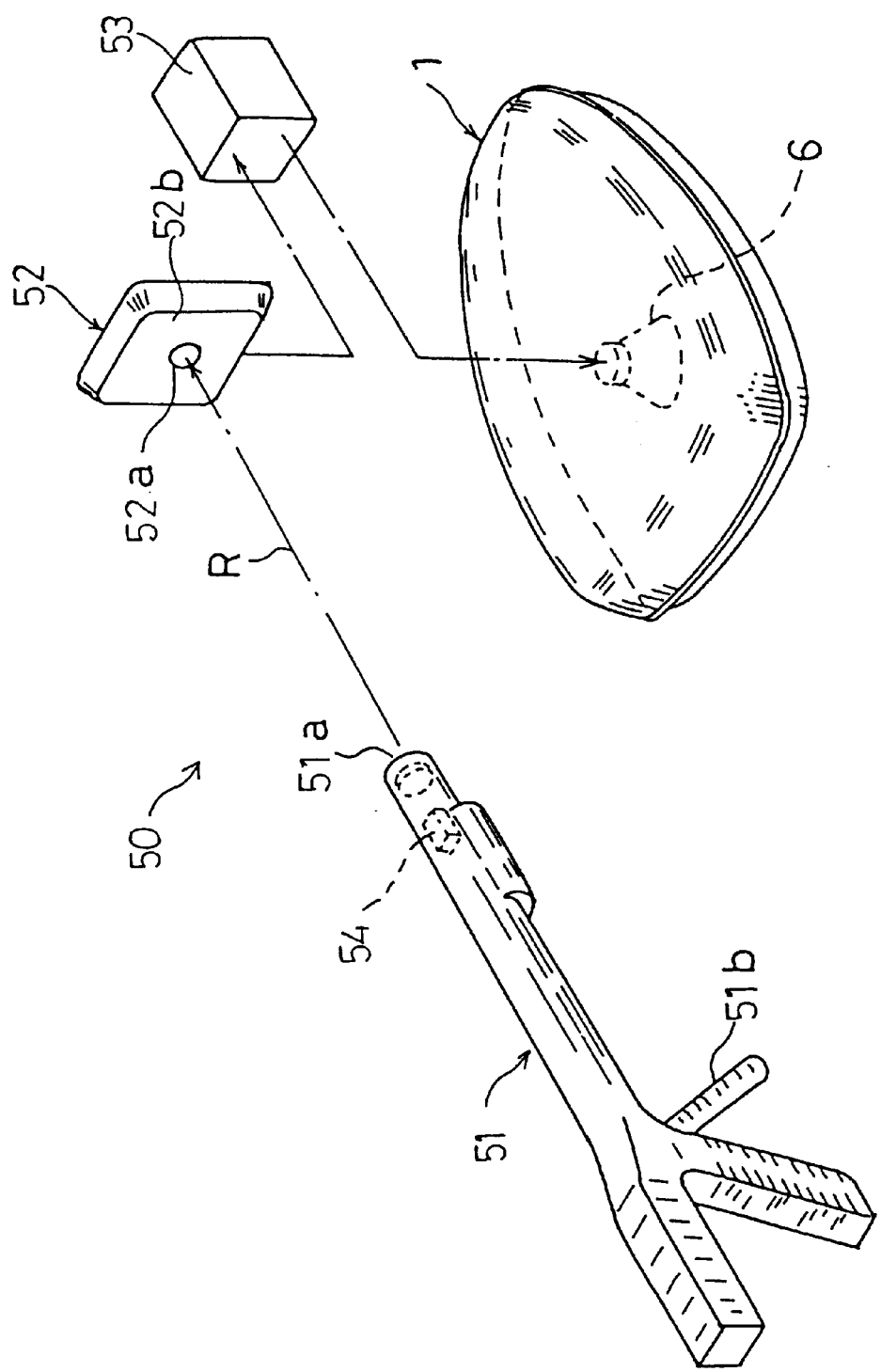
FIG. 20 is a schematic view showing the basic arrangement of a light-beam utilizing playing apparatus according to an embodiment of the present invention.

FIG. 20 is a schematic view showing the schematic structure of a light-beam using playing apparatus according to an embodiment of the present invention. As shown in FIG. 20, a light-beam using playing apparatus 50 comprises a light beam gun 51 for emitting light beam R through a muzzle 51a at the leading end thereof; a target 52 for receiving the light beam R; a sound control unit 53 for selectively transmitting two types of sound signals in response to the signals from the target 52; and the body-acoustic device 1 having the speaker 6 included therein to which the signals from the sound control unit 53 is supplied. Note that the sound control unit 53 includes a sound source, a sound control means, a battery, an amplifier and the like, to be described later.

Figure 21:
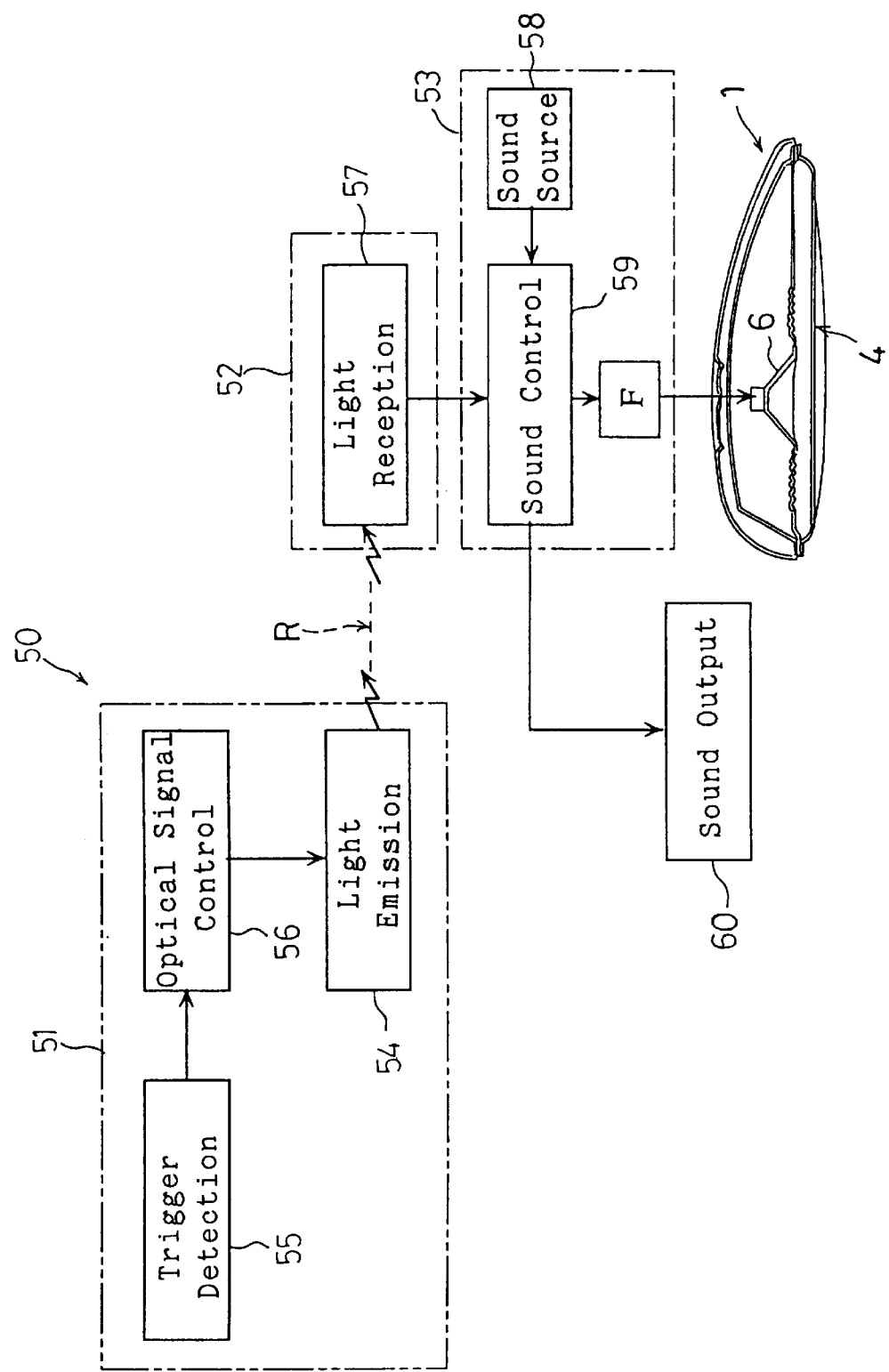
FIG. 21 is a block diagram showing a detailed arrangement of the light-beam utilizing playing apparatus embodying the present invention.

The structure of the light-beam using playing apparatus 50 will now be described in detail. As shown in FIG. 21, the light beam gun 51, which is a light emitting device, comprises a light emission means 54 disposed adjacent to the muzzle 51a; a trigger operation detection means 55 for detecting the state of operation of the trigger 51b of the light beam gun 51; and a light-signal control means 56 for variously controlling the state of the signals to be transmitted to the light emission means 54 in response to the signals from the trigger operation detection means 55.

The target 52 which is a light receiving device is provided with a light receiving means 57 for receiving light beam R emitted from the light emission means 54. A sound control means 59 for receiving acoustic signals transmitted from a sound source 58 receives the signals from the light receiving means 57. Moreover, the sound control means 59 transmits at least two types of acoustic signals to the speaker 6 of the body-acoustic device 1 through a low-pass filter or a band-pass filter. The sound control means 59 transmits at least two types of acoustic signals similar to the foregoing signals to the light-beam using playing apparatus 50 which is capable of generating sound in a usual manner.

More specifically, the trigger operation detection means 55 comprises switches and sensors which are capable of detecting the amount of transition of the trigger 51b. The light emission means 54 is formed by a semiconductor laser unit or a combination of an LED (Light Emission Diode) and a lens for generating parallel light beams or another light emitting device for emitting infrared rays. Therefore, the light beam R emitted from the light emission means 54 is a laser beam, a naturally emitted light beam or a near infrared ray. The light-signal control means 56 comprises an IC circuit or a microcomputer.

The light receiving means 57 comprises a photodiode, a phototransistor or an avalanche photodiode. The sound control means 59 comprises an IC circuit or a microcomputer. In this case, the light receiving means 57 is attached to the inside portion of a casing 52b in such a manner that it faces an opened window 52a formed in the front surface of the target 52. The opened window 52a is covered with a protective member made of a light transmissive material.

In a period in which the trigger operation detection means 55 detects that the trigger 51b is not pulled for a predetermined distance, a first-form signal is transmitted from the light-signal control means 56 to the light emission means 54. If the trigger 51b is pulled for a degree greater than a predetermined distance, a second-form signal is transmitted. Therefore, if the muzzle 51a of the light beam gun 51 is directed to a target portion of the target 52 in a state where the trigger 51b is not completely be pulled, a light beam for conveying the first-form signal is received by the light receiving means 57 of the target 52. In a case where the trigger 51b has been completely be pulled, a light beam for conveying the second-form signal is received by the light receiving means 57.

In a case where light beams for conveying the two types of different form signals have respectively been transmitted, the sound control means 59 transmits an acoustic signal having a first characteristic through the light receiving means 57 in response to the supplied first-form signal. The sound control means 59 transmits an acoustic signal having a second characteristic in response to the second-form signal. The two types of the signals are those for causing the body-acoustic device 1 to generate two types of vibrations respectively having different amplitudes or two types of vibrations having different intermittent period in a case where vibrations are generated intermittently. Therefore, different vibrations generated due to different sound pressures are generated in the body-acoustic device 1 in accordance with the state where the muzzle 51a of the light beam gun 51 is simply direct to the light receiving means 57 and the state where the muzzle 51a has been directed and then the trigger 51b has been completely be pulled.

The speaker 6 is supplied with a signal fetched through the filter F and having a frequency in a low frequency region from, for example, 120 to 160 Hz. A fact has been found that the low frequency region signal is propagated as vibrations comfortable to the back of the user. Moreover, the low frequency vibrations not higher than 100 Hz cannot easily audibly be recognized. Therefore, appropriate selection of the filter F is required to obtain appropriate vibrations in the low frequency in order to satisfy the requirement when the machine is used.

Then, the operation of the foregoing embodiment will now be described in such a manner that a case where a so-called shooting game is performed by using the light beam gun 51 is taken as an example.

As shown in FIG. 9, a player uses the shoulder belts 15 and the side belts 16 to reliably bring the body-acoustic device 1 into the back so as to be held on the back and then the player hold the vibration information control means 41 by the hands. Moreover, as shown in FIG. 10, the target 52 is attached to the breast by using the shoulder belts 15. In the foregoing case, another exclusive fastening belt may be employed to attach the target 52. Note that the sound control unit 53 including the sound source 58, the battery, the amplifier and the like may be attached by the shoulder belts 15 and the side belts 16 though the state is omitted from illustration. In the foregoing state, the bottom portion 3x of the bottom half case 3 of the body-acoustic device 1 is in uniform contact with the back.

Similarly to the foregoing case, each of a plurality of players has the light beam gun 51 by the hands and the target 52 and the body-acoustic device 1 on the body when the players start the game. Specifically, when one player directs the muzzle 51a of the light beam gun 51 toward the target 52 of another player and pulls the trigger 51b, whether or not the light beam R has hit the opened window 52a, which is the target point of the target 52, that is, the light receiving means 57 is determined. The number of hits of the player which has received the light beams has reached a predetermined number of times (for example, three times), the player is made to be a defeated.

During the progress of the game, a light beam emitted from the light emission means 54 for conveying the first-form signal transmitted from the light-signal control means 56 at the moment at which the muzzle 51a of the light beam gun 51 has been aimed to the target point of the target 52 is received by the light receiving means 57 of the target 52. Thus, the acoustic signal having the first characteristic is transmitted from the sound control means 59 to the speaker 6 of the body-acoustic device 1. As a result, vibrations generated in the body-acoustic device 1 and corresponding to the acoustic signal having the first characteristic are propagated to the bottom portion 3x of the container 4. Since the player feels the vibrations on the back, the player is able to bodily senses a fact that the player is aimed by another player.

In a case where another player has completely pulled the trigger 51b of the light beam gun 51 in the foregoing case, the light-signal control means 56 transmits the second-form signal in response to a signal supplied from the trigger operation detection means 55. Moreover, a light beam for conveying the second-form signal is emitted from the light emission means 54.

Since the light beam is received by the light receiving means 57 of the target 52, the sound control means 59 transmits the acoustic signal having the second characteristic to the speaker 6 of the body-acoustic device 1. As a result, vibrations corresponding to the acoustic signal having the second characteristic are generated in the body-acoustic device 1. When the player has sensed the transmission of the vibrations to the back, the player is able to bodily sense hit of a light beam emitted from another player. As described above, hit of the light beam is transmitted to the body as the vibrations so that the player feels as if the player is hit by a live cartridge and therefore improved reality is obtained.

In a case where the number of times at which the target 52 of the player is hit by the light beams reach a predetermined times, an acoustic signal having a third characteristic, for example, a signal having a large amplitude, is transmitted from the sound control means 59 when the light beam which is the predetermined number of times of hits. As a result, large vibrations are generated in the body-acoustic device 1 so that the player recognizes that the player is a defeated. If necessary, usual sound is generated from the sound output means 60 in the foregoing embodiments.

A state where vibrations are generated in the body-acoustic device 1 as described above will specifically be described. Both of the two types of acoustic signals transmitted from the sound control means 59 are allowed to pass through the filter F so as to be formed into acoustic signals in only the low frequency region so as to be supplied to the speaker 6. As a result, the speaker 6 generates sound pressure from the speaker 6, and then the sound pressure is formed into pressure waves in the low frequency region so as to directly be propagated to the bottom portion 3x of the bottom half case 3. As an alternative to this, air vibrations are initially generated in the sound generative space 11. Air vibrations generated in the foregoing case are allowed to pass through the through hole 12 (or the slit or the like) of the partition plate 5 so as to be propagated to the background space 10. As a result, air vibrations are generated in the overall internal space of the container 4.

Since the cone paper of the speaker 6 is vibrated simultaneously, also the speaker 6 vibrates while deflecting and deforming the wave plate portion 9 of the partition plate 5.

Thus, even in a case where the diameter of the speaker 6 is small, a sound pressure amplifying effect can be obtained as if the diameter of the speaker 6 is enlarged. As a result, sound pressure having a satisfactory high level can be generated. Therefore, although the speaker 6 included in the body-acoustic device 1 has a small diameter because of the limitation of the installation area, satisfactory very low-pitched sound can be generated.

Since satisfactorily intense vibrations are transmitted from the body-acoustic device 1 to the back of the player when the player is aimed by another player or the player is hit by the light beam R during the shooting game, the players are able to play a thrilling and powerful game with satisfactory reality.

The structure of the light beam gun 51 may be formed such that two types of signals are transmitted from the light-signal control means 56 in accordance with the case where the player has completely pulled the trigger 51b of the light beam gun 51 and the case where the player does not pull the same. It is preferable that the structure is arranged such that the first-form signal is transmitted when the player has slightly pulled the trigger 51b and the second-form signal is transmitted when the player has completely pulled the trigger 51b. In this case, the light-signal control means 56 does not transmit the signal for causing the light beam to be emitted. Thus, the waste of electric power for emitting the light beam and the like can be saved corresponding to the omission of the transmission of the signal.

Although the foregoing embodiment has the structure such that only two types of signals are transmitted from the light-signal control means 56, a structure may be formed such that three or more types of signals are transmitted if the contents of a game requires the same. In addition, the light emitting device may be another structure except the light beam gun 51. If the structure is able to emit a light beam to the aimed target, another structure may be employed. The light receiving device may be a device except the target 52 if the employed device has a function for receiving the light beam. If the employed device is not arranged to be fit to the body, another structure may be employed to establish the present invention.

The above-mentioned embodiment has the structure such that the rucksack-type body-acoustic device 1 which propagates vibrations to the back of the user is used to form the light-beam using playing apparatus 50 according to the present invention. Use of the following body-acoustic device 1 enables the body-acoustic device 1 according to the present invention to be formed.

That is, as shown in FIG. 17, the present invention is formed by using the body-acoustic device 1 which is fitted to the waist of a player by using the waist belt 17.

The body-acoustic device 1 for use in this case has a shape formed into a rectangular shape as shown in FIG. 12 such that the two side ends are slightly warped. The structure in which a waist belt 17 to be attached to the body-acoustic device 1 has a elastic and expandable belt member 17a having a through hole 17x and the internal structure of the body-acoustic device 1 are basically the same as those of the foregoing embodiment, as shown in FIGS. 13 and 14. Also this embodiment may be structured such that the two cover members 7a and 7b are integrated to form the holding case 7 and the container 4 is accommodated in the holding case 7 (see FIG. 15). As an alternative to this, the top half case 2 may be omitted and the container may be formed by the bottom half case 3 and the partition plate 5. Therefore, common elements shown in FIGS. 12 to 17 to those of the body-acoustic device 1 of the above-mentioned embodiment are given the same reference numerals and the common elements are omitted from description.

Since the body-acoustic device 1 is smaller than the body-acoustic device 1 according to the foregoing embodiment, the body-acoustic device 1 enables vibrations to concentrically be transmitted to the waist portion through the vibration transmissive surface having a smaller area if the same speaker 6 is used. Therefore, locally intense vibrations can be obtained.

In a case where the body-acoustic device 1 is used to form the light-beam using playing apparatus 50, various effect, such as improvement in the virtual reality, can be obtained similarly to the foregoing embodiments. However, in the case where the body-acoustic device 1 is employed, a fastening means for fastening the target 52 to the breast of the player is required.

When a player operates the light beam gun 51 to emit light beam R toward the target 52 in a state where each of plural players has the body-acoustic device I and the target 52 on the body, the game using the light beam R is played. That is, the target 52 is fitted to the breast of each player and one player has the light beam gun 51 and emits a light beam to the target 52 of another player so that the so-called shooting game is played.

When the light beam emitted from the light beam gun 51 has hit the target 52, that is, when the light beam R has been received by the light receiving means 57, the acoustic signal is transmitted from the sound control means 59 to the speaker 6 of the body-acoustic device 1. As a result, sound pressure is generated from the speaker 6, and then the sound pressure generates vibrations in the outer wall of the container 4 of the body-acoustic device 1. The vibrations are transmitted to the back of the player having the body-acoustic device 1.

As a result, the player is able to bodily sense hit of the light beam emitted from the light beam gun 51 of another player as vibrations. Therefore, further advanced reality, for example actual hit of a live cartridge, can be sensed as compared with the conventional structure in which only sound is used to sense the hit.

In the case where the light beam emitted from the light beam gun 51 is a light signal in the first form, the acoustic signal having the first characteristic is transmitted from the sound control means 59. Thus, the player is able to detect a fact that, for example, the muzzle 51*a* of the light beam gun 51 of another player is aimed to the own target 52 in accordance with the type of vibrations indicated with the sound. In the case where the light beam R is a light signal in the second form, the acoustic signal having the second characteristic is transmitted so that the player is able to detect a fact that the light beam R has hit the own target 52 in accordance with vibrations of a different type.

As a result of the above-mentioned operation, the player is able to bodily recognize a fact that the own target is aimed in accordance with vibrations as well as hit of the own target 52 by the light beam R. Thus, intense thrill can be experienced and entertainment and pleasure can be provided.

Figure 22:
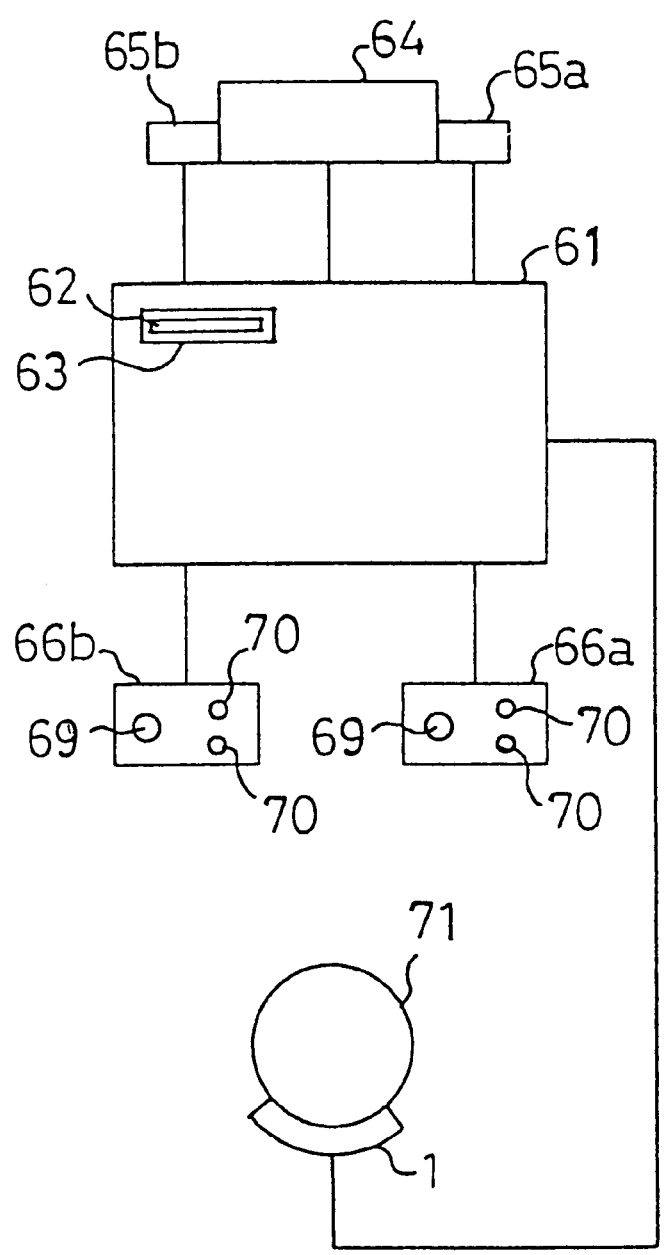
FIG. 22 is a schematic view showing the arrangement of a video game apparatus incorporating a body-acoustic device embodying the present invention.

FIG. 22 is a schematic view showing the structure of a video game apparatus having the audio apparatus according to an embodiment of the present invention. A video game apparatus body 61 has a case in which an insertion port 63 for receiving a CD-ROM 62, which is an example of a storage medium, is formed.

A display unit 64 having a display screen, a pair of speakers 65*a* and 65*b* disposed on the two sides of the display unit 64, a pair of controllers 66*a* and 66*b* and the body-acoustic device 1 are connected to the video game apparatus body 61. Each of the controllers 66*a* and 66*b* has a joy stick 69 and a plurality of depression button switches 70. The body-acoustic device 1, as shown in FIG. 9, worn on the back of the player 71. The position of the player 71 with respect to the speakers 65*a* and 65*b* is previously determined. Note that the player 71 is permitted not to have the light beam gun 41, and the body-acoustic device 1 may be of a type which is fitted to the waist of the player 71, as shown in FIG. 17.

The video game apparatus body 61 transmits video signals and sound signals to the display unit 64, the speakers 65*a* and 65*b* and the body-acoustic device 67 in response to a program read from the CD-ROM 62, video information, sound information, and operations of the joy stick 69 and the depression button switches 70 of the controllers 66*a* and 66*b* performed by the player 71. The CD-ROM 62 stores the program for the video game, image information and sound information as digital data recorded previously. By inserting the CD-ROM 62 into the insertion port 63 of the video game apparatus body 61, recorded information can be read. As for sound information, it will be described later. The insertion port 63 is formed to mount the CD-ROM 62 on the video game apparatus body 61. The display unit 64 displays images of the character of the video game and the background in response to a signal supplied from the video game apparatus body 61. The speakers 65*a* and 65*b* are operated in response to the sound signal supplied from the video game apparatus body 61 to generate sound. That is, the sound signal formed in accordance with digital data recorded on the CD-ROM 62 is converted into air vibrations so as to be transmitted to the auditory sense of the player 71. The controllers 66*a* and 66*b* transmit the operation signals obtained due to the operations of the joy stick 69 and the depression button switches 70 performed by the player 71 to the video game apparatus body 61. The body-acoustic device 1 vibrates in response to the very low frequency acoustic signal supplied from the video game apparatus body 61 to transmit vibrations to the body of the player 71. That is, the acoustic signal formed in accordance with digital data recorded on the CD-ROM 62 is converted into mechanical vibrations so as to be transmitted to the auditory sense of the player 71.

Figure 23:
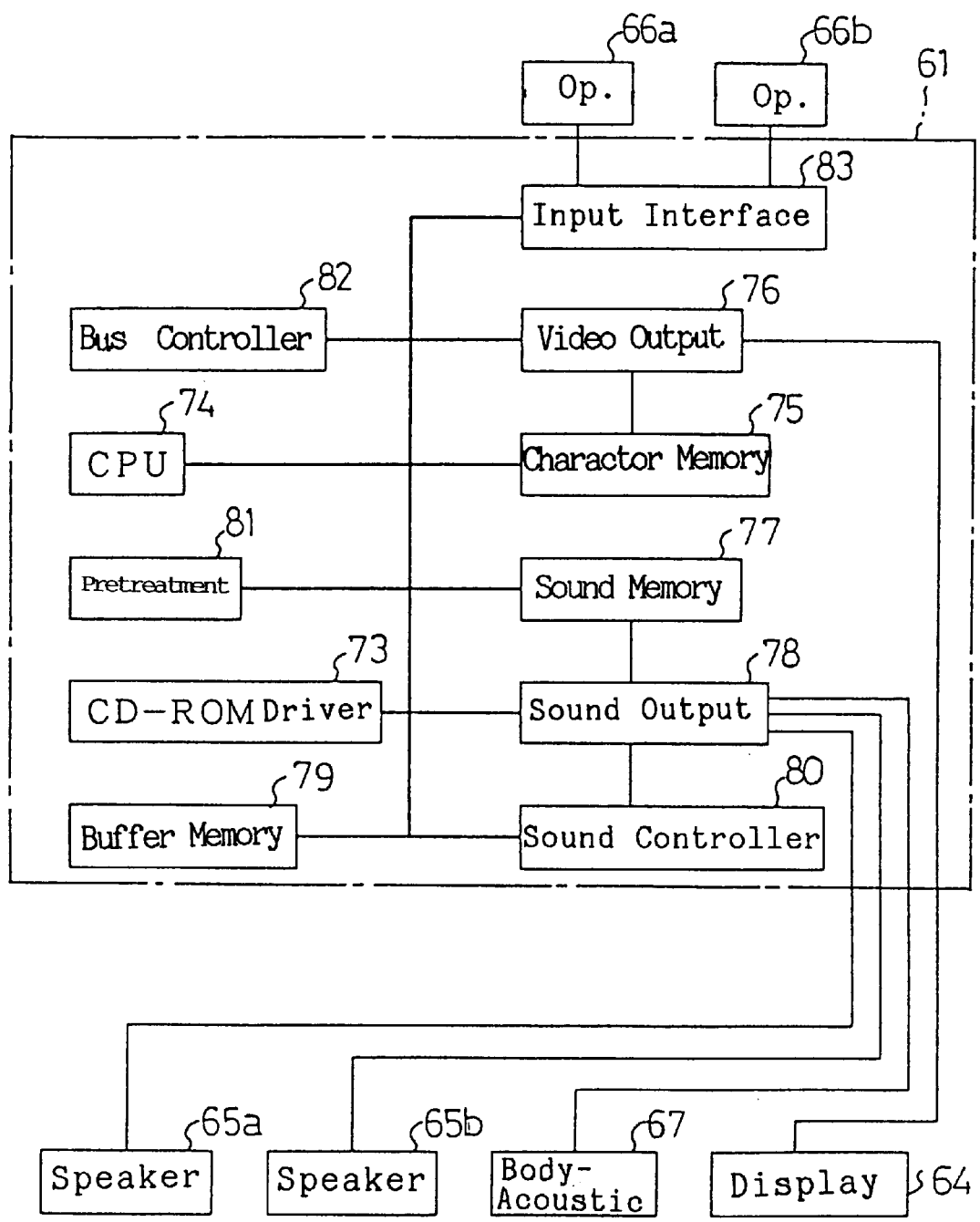
FIG. 23 is an overall circuit block diagram of the video game apparatus incorporating the body-acoustic device embodying the present invention.

FIG. 23 is an overall structural view mainly showing circuit blocks of the video game apparatus having the acoustic apparatus according to the embodiment of the present invention.

The video game apparatus body 61 includes a CD-ROM driver 73, a CPU 74, a character memory 75, a video output means 76 having a digital signal processor (hereinafter called a "DSP"), a sound memory 77, a sound output means 78 having the DSP, a buffer memory 79, a sound controller 80, a pre-processing means 81, a bus controller 82 and an input interface 83. The foregoing units are connected to one another by a bus line. The CPU 74 is a 32-bit RISC type CPU. In this embodiment, vibrations of air generated by the speaker is called "sound", while mechanical vibrations generated by the body-acoustic device are called "acoustic sound". Note that the "acoustic sound" does not excluded low frequency region sound.

The CD-ROM driver 73 reads digital data recorded on the CD-ROM 62. The CPU 74 has a CD-ROM driver 73 for controlling the overall operations of the video game apparatus body 61 in accordance with the program read from the CD-ROM 62. The character memory 75 stores image information about the character read from the CD-ROM 62. The video output means 76 transmits the video signal to the display unit 64 to follow an instruction issued from the CPU 74. The sound memory 77 stores sound wave data read from the CD-ROM 62 by the CD-ROM driver 73. That is, the CD-ROM 62 stores, as sound information, sound tracks in which very low-pitched sound region for use in music or the like is superimposed, a microprogram for the sound output means 78 to be stored in the memory of the sound output means 78 and sound wave data in which the very low-pitched sound region for use as effect sound is superimposed. The microprogram for the sound output means 78 also includes a program, so-called "Q sound" for use to control the acoustic image position. The sound output means 78 follows an instruction issued from the sound controller 80 to transmit the sound signal to the speakers 65*a* and 65*b* and the body-acoustic device 1. The buffer memory 79 temporarily stores various digital data items. The sound controller 80 follows an instruction from the CPU 74 to control the sound output means 78. The pre-processing means 81 performs previous processes to, for example, load the program read from the CD-ROM 62 by the CD-ROM driver 73. The bus controller 82 control to, for example, give right of use of the bus line to an element among various elements connected to the bus line. The input interface 83 receives the operation signals supplied from the controllers 66*a* and 66*b*.

The operation will now be described. When the player 71 has inserted the CD-ROM 62 into the insertion port 63 of the video game apparatus body 61 and then performed predetermined operations, the CD-ROM driver 73 reads the contents recorded on the CD-ROM 62. The pre-processing means 81 performs the previous process such that the program of the video game read by the CD-ROM driver 73 is installed. Then, the CPU 74 controls the video output means 76 so that an image signal in accordance with image information read from the CD-ROM 62 by the CD-ROM driver 73 is transmitted from the video output means 76 to the display unit 64. As a result, a movie is displayed on the display screen of the display unit 64.

Among sound information recorded on the CD-ROM 62 and read by the CD-ROM driver 73, the microprogram for the sound output means 78 is stored in the memory of the sound output means 78 so as to control the basic operations of the sound output means 78. Since the microprogram includes the program, so-called "Q sound" for controlling the acoustic image position, the sound output means 78 transmits a sound signal subjected to the acoustic image position control.

That is, the sound track on which the very low-pitched sound region has been superimposed is directly supplied to the sound output means 78 so as to be subjected to sound volume control and acoustic image position control, and then transmitted from the sound output means 78 to the speakers 65a and 65b and the body-acoustic device 1 as the sound signal. Since the acoustic image position control has been performed in such a manner that the acoustic images emitted from the speakers 65a and 65b are positioned adjacent to the body-acoustic device 1, that is, adjacent to the player 71, sound and the acoustic sound are not bipolar-separated. Thus, the player 71 has an illusion as if the sound generating points of the speakers 65a and 65b have been moved adjacent to the player 71.

Therefore, the player 71 is able to hear sound or acoustic sound having a presence without uncomfortable feeling.

Sound wave data on which the very low-pitched sound region has been superimposed is stored in the sound memory 77 so as to be read out by the sound output means 78 in accordance with an instruction issued from the sound controller 80 instructed by the CPU 74 in a case where the player 71 has operated the joy stick 69 or the depression button switches 70 of the controllers 66a and 66b, followed by being subjected to the acoustic image position control. Then, the sound wave data is converted into a sound signal so as to be subjected to the sound volume control and the like, and then transmitted from the sound output means 78 to the speakers 65a and 65b and the body-acoustic device 1. Since the acoustic image emitted from the speakers 65a and 65b has been subjected to the acoustic image position control so as to locate the acoustic image near the body-acoustic device 1, that is, near the player 71, bipolar-separation into sound and the acoustic sound can be prevented. Thus, the player 71 has an illusion as if the sound generating points of the speakers 65a and 65b have been moved adjacent to the player 71. Moreover, an image and acoustic sound corresponding to the operations of the controllers 66a and 66b by the player 71 can be obtained so that the player 71 has a feeling of identification with a hero of the video game and an effect of empathy is improved.

Since digital data stored in the CD-ROM 62 has been processed in such a manner that a portion or the overall body Of acoustic images from the plural speakers 65a and 65b can be located near the body-acoustic device 1, the positions of the acoustic images from the speakers 65a and 65b and the position of the acoustic image of the body-acoustic device 1 can be made coincide with each other. Therefore, bipolar-separation of sound and acoustic sound can be prevented. As a result, the player 71 can be provided with powerful sound field exhibiting excellent presence without uncomfortable feeling. As a processing means for previously processing digital data in order to locate acoustic images from the plural speakers 65a and 65b at positions near the body-acoustic device 1, a variety of means for realizing stereoscopic acoustic image may be employed.

For example, so-called Dolby surround using a multi-speaker and Q sound for controlling the amplitude, the phase or the delay of information of the supplied sound may be employed. Among the foregoing methods, a means using the Q sound may effectively be employed. Since the Q sound has been described in detail in, for example, Japanese Patent Laid-Open No. 2-298200 and Japanese Patent Laid-Open No. 4-242684, it is not described in detail. By performing the process called the Q sound, the player 71 has an illusion as if the sound generating points have been moved to the positions adjacent to the player 71. That is, when an acoustic signal is recorded on the CD-ROM 62 as digital data, the digital data is subjected to the Q sound process. Moreover, the very low-pitched sound region for the body-acoustic device 1 is superimposed so that the positions of the acoustic image formed by the speakers 65a and 65b and the position of the acoustic image of the body-acoustic device 1 can be made coincide with each other. Even if the acoustic images from the speakers 65a and 65b must be allowed to coincide with the acoustic image of the body-acoustic device 1, the coincidence is not always required. Among acoustic images relating to the hero, those which are aimed and those to which the hero belongs, for example, noise of bullets and arrows grazing the hero is preferable that its sound field be moved in order to make the presence to be effective. Therefore, only a portion or the overall body of the acoustic images of the speakers 65a and 65b is required to be made coincide with the position of the acoustic image of the body-acoustic device 1, if necessary. In view of foregoing, the position control of a specific acoustic image with respect to an acoustic image according to the present invention includes the foregoing dynamic control method.

Moreover, the microprogram for executing the foregoing Q sound process has been recorded in the CD-ROM 62, and the microprogram reproduced from the CD-ROM 62 is stored in the memory of the sound output means 78 so that the sound output means 78 performs the Q sound process. That is, since the sound output means 78 performs the Q sound process in accordance with the microprogram, the degree of freedom of the Q sound process can be improved. Moreover, an arbitrarily sound signal corresponding to change in the screen occurring due to the operation of the player 71 can freely be subjected to the Q sound process. Therefore, the effect of empathy for giving the feeling of identification to the player with the hero can furthermore be improved.

Since image information, which is reproduced, is changed in accordance with the program stored in the CD-ROM 62 in response to the operation performed by the player 71 and also sound information is changed to correspond to the change in the image information, the effect of empathy for giving the feeling of identification to the player with the hero can furthermore be improved.

Although image information, which is reproduced, is changed in accordance with the program stored in the CD-ROM 62 in response to the operation performed by the player 71 and also sound information is changed to correspond to the change in the image information, the changed sound information can freely be subjected to the Q sound process so that the effect of empathy for giving the feeling of identification to the player with the hero can furthermore be improved.

Moreover, the acoustic image position control program stored in the CD-ROM 62 is reproduced so as to be stored in the memory of the sound output means 78. Then, the sound output means 78 is operated in accordance with the acoustic image position control program so that the acoustic image position control means is realized. Therefore, even if the acoustic image position control program is not installed in the video game apparatus, the acoustic image position control can be performed.

Since the CD-ROM 62 is employed, data in a large quantity can be stored with a low cost.

Although the CD-ROM 62 is employed as the storage medium in the foregoing embodiment, the other storage mediums may, of course, be employed. That is, the storage medium includes a ROM cartridge, a hard disk, a MO (magneto optical disk) and means capable of providing information through communication.

Although the foregoing embodiment employs a home use video game apparatus, the acoustic apparatus according to the Present invention may, of course, be used in a business use video game apparatus.

Although the foregoing embodiment has the structure such that the waist belt 17 has the body-acoustic device 1 on the back or the waist, a variety of body-acoustic devices 1 may, of course, be employed, for example, a chair type machine on which the player 71 is seated.

Although one pair of the speakers 65*a* and 65*b* are employed in the foregoing embodiment, two or more pairs of speakers may, of course, be employed.

In the foregoing embodiment, the microprogram for the sound output means 78 stored in the CD-ROM 62 is read by the CD-ROM driver 73 so as to be stored in the memory of the sound output means 78 so that the acoustic image position control means called the so-called Q sound is realized. However, the acoustic image position control means may be formed by a DSP or the like which has a memory storing the microprogram for performing the Q sound and the acoustic image position control means may be mounted on the video game apparatus body 61 as an external apparatus. As a result, the acoustic image position control can be performed by attaching the acoustic image position control means to the conventional video game apparatus without a necessity of employment of a video game apparatus including the acoustic image position control means.

Moreover, the acoustic image control, such as the Q sound process may previously be performed when usual sound track is recorded on the CD-ROM 62. As a result, the necessity for the video game apparatus body 61 to perform the acoustic image position control, such as the Q sound process, can be eliminated, and the sound track recorded in the CD-ROM 62 is required to be reproduced to obtain the acoustic image position control effect.

When sound wave data is recorded in the CD-ROM 62, the acoustic image position control, such as the Q sound process, may previously be performed. As a result, the necessity for the video game apparatus body 61 to perform the acoustic image position control, such as the Q sound process, can be eliminated. When sound wave data read from the CD-ROM 62 by the CD-ROM driver 73 and stored in the sound memory 77 is read in accordance with the operations of the controllers 66*a* and 66*b* by the player 71 so as to be transmitted from the sound output means 78, the effect of the acoustic image position control can be obtained.

Although the acoustic apparatus according to the present invention is included in the video game apparatus in the foregoing embodiment, the acoustic apparatus according to the present invention is not limited to the video game. The acoustic apparatus according to the present invention may be included in a video apparatus, such as a video disk player or a video tape recorder which reproduces usual images.

When the acoustic apparatus according to the present invention is not combined with the video apparatus but it is used as a usual acoustic apparatus which does not reproduces image signals but which reproduces only acoustic signals, sound and acoustic sound exhibiting satisfactory presence can be enjoyed.

INDUSTRIAL APPLICABILITY

The body-acoustic device according to the present invention can be employed as, for example, an amusement apparatus or an acoustic apparatus.

The amusement apparatus and the control method therefor can be adapted to, for example, a video game apparatus.

The light-beam using playing apparatus according to the present invention can be adapted as a game apparatus using, for example, a light beam gun.

The acoustic apparatus according to the present invention may be employed in, for example, a video game apparatus.

We claim:

1. A playing apparatus comprising:

input means operated by a player;

a game progression control means for determining or controlling a progression state of a game in response to signals from the input means;

output means for generating image information signals in response to signals from the game progression means;

a display for displaying an image in response to the image information signals from the output means, the image including at least a character manipulated in response to operation of the input means by a player;

specific state determining means for determining, in response to signals from the game progression control means, whether or not the character manipulated by the operator is in a specific state which is invisible on the display;

vibration information control means for transmitting vibration information signals upon detection of the specific state by the specific state determining means; and vibration generating means for generating vibrations in response to the vibration information signals from the vibration information control means.

2. The playing apparatus according to claim 1, wherein the specific state is a dangerous state.

3. The playing apparatus according to claim 2, wherein the dangerous state is an approach of the character toward a mine which is invisible on the display.

4. The playing apparatus according to claim 1, wherein the vibration generating means comprises a body-acoustic device which causes an outer wall of a container to vibrate in accordance with sound generated by a speaker, the vibration information signals from the vibration information control means comprising acoustic signals transmitted to the speaker.

5. The playing apparatus according to claim 4, wherein the acoustic signals transmitted to the speaker are in a predetermined low frequency region.

6. A playing apparatus comprising:

input means operated by a player;

a game progression control means for determining or controlling a progression state of a game in response to signals from the input means;

vibration information control means for transmitting vibration information signals under control of the game progression means; and vibration generating means for generating vibrations in response to the vibration information signals from the vibration information control means;

wherein the vibration generating means comprises a body-acoustic device including a container internally provided with a partitioning plate which is fitted with a speaker, at least a portion of the partitioning plate comprising a wave plate portion which flexibly vibrates with the speaker.

7. The playing apparatus according to claim 6, wherein the wave plate portion of the partitioning plate comprises a plurality of annular serrations which are concentric with an opening formed in the partitioning plate for attachment to the speaker.

* * * * *